(12) United States Patent
Horst

(10) Patent No.: US 7,239,065 B2
(45) Date of Patent: Jul. 3, 2007

(54) ELECTROSTATIC ACTUATOR WITH FAULT TOLERANT ELECTRODE STRUCTURE

(75) Inventor: Robert W. Horst, San Jose, CA (US)

(73) Assignee: Tibion Corporation, Moffett Field, CA (US)

( * ) Notice: Subject to any disclaimer, the term of this patent is extended or adjusted under 35 U.S.C. 154(b) by 355 days.

(21) Appl. No.: 10/874,986

(22) Filed: Jun. 22, 2004

(65) Prior Publication Data
US 2005/0006980 A1    Jan. 13, 2005

Related U.S. Application Data

(60) Provisional application No. 60/485,882, filed on Jul. 8, 2003.

(51) Int. Cl.
 H02N 1/00 (2006.01)
(52) U.S. Cl. .................................. 310/309
(58) Field of Classification Search ............ 310/309, 310/12; 318/116; 360/294.2, 294.3
See application file for complete search history.

(56) References Cited

U.S. PATENT DOCUMENTS

| | | | |
|---|---|---|---|
| 4,754,185 A * | 6/1988 | Gabriel et al. | 310/309 |
| 5,239,222 A | 8/1993 | Higuchi et al. | 310/309 |
| 5,378,954 A | 1/1995 | Higuchi et al. | 310/309 |
| 5,448,124 A | 9/1995 | Higuchi et al. | 310/309 |
| 5,534,740 A | 7/1996 | Higuchi et al. | 310/309 |
| 5,541,465 A | 7/1996 | Higuchi et al. | 310/309 |
| 5,585,683 A | 12/1996 | Higuchi et al. | 310/309 |
| 5,708,319 A | 1/1998 | Ban et al. | 310/309 |
| 5,789,843 A | 8/1998 | Higuchi et al. | 310/309 |
| 6,314,835 B1 | 11/2001 | Lascelles et al. | 74/640 |
| 6,472,795 B2 * | 10/2002 | Hirose et al. | 310/309 |
| 6,525,446 B1 | 2/2003 | Yasuda et al. | 310/309 |
| 6,936,994 B1 * | 8/2005 | Gimlan | 320/101 |

(Continued)

FOREIGN PATENT DOCUMENTS

JP    63-136978    * 6/1988

(Continued)

OTHER PUBLICATIONS

"Electrostatic Artificial Muscle: Compact, High-Power Linear Actuators with Multiple-Layer Structures", Niino et al., Proc. IEEE Workshop on Micro Electro Mechanical Systems, Oiso Japan, Jan. 1994.*

(Continued)

*Primary Examiner*—Karl Tamai
(74) *Attorney, Agent, or Firm*—Perkins Coie LLP

(57) ABSTRACT

A high-power electrostatic actuator comprising rotor and stator layers with fault-tolerant electrode structures, a housing to contain the electrodes and dielectric fluid, and electronic circuitry driving a plurality of high-voltage phases. The actuator is constructed from multiple rotor and stator films separated by spacing elements. The electrode structure provides self-alignment for precise assembly. The actuator assembly includes built-in fine-position sensors to allow optimal timing in powering phases, and a coarse position sensor for feedback control. The electrode structure has a large region of linear force to provide low torque-ripple allowing simple high/low voltage pulsing instead of analog high voltage waveforms. Single or double sided flexible circuit manufacturing techniques are used to fabricate the rotor and stator films at low cost.

20 Claims, 20 Drawing Sheets

U.S. PATENT DOCUMENTS 6,966,882 B2 * 11/2005 Horst ............................ 601/5
2005/0006980 A1 * 1/2005 Horst ......................... 310/309

FOREIGN PATENT DOCUMENTS

| JP | 05-260766 | * | 10/1993 |
| JP | 06-38551 | * | 2/1994 |
| JP | 07-274540 | * | 10/1995 |
| JP | 08-033360 | * | 2/1996 |
| JP | 09-261975 | * | 10/1997 |

OTHER PUBLICATIONS

Translation of JP 8-149858, Higuchi et al., Jun. 1996.*
Tranlsation of JP 05-260,766, Hishiguchi et al., Oct. 1993.*
"Powered Orthosis Project," ASEL: Robotics: Powered Othosis, http://www.asel.udel.edu/robotics/orthosis/orthosis.html, p. 1, last update: Jan. 17, 1999.
Misuraca et al. "Lower Limb Human Muscle Enhancer," *International Mechanical Engineering Conference and Exposition*, pp. 1-7, Nov. 11-16, 2001.
Kawamoto et al. "Power Assist System HAL-3 for Gait Disorder Person," *ICCHP 2002, LNCS 2398*, pp. 196-203, 2002.
"Dual Excitation Multiphase Electrostatic Drive (DEMED)[1,2]," http://www.intellect.pe.u-tokyo.ac.jp/research/es_motor/demed_e.html, pp. 1-5, printed Nov. 21, 2002.
"High-Power Electrostatic Motor," http://www.intellect.pe.u-tokyo.ac.jp/research/es_motor/es_motor_e.html, pp. 1-2, printed Nov. 21, 2002.
"Pulse Driven Induction Electrostatic Motor," http://www.intellect.pe.u-tokyo.ac.jp/research/es_motor/pim_e.html, pp. 1-5, printed Nov. 21, 2002.
"Patented Motion Hinge," http://www.townsenddesign.com/motion.html, p. 1, printed Nov. 21, 2002.
"Functional Bracing Solutions," http://www.townsenddesign.com/functional.html, p. 1, printed Nov. 21, 2002.
"Patented Motion Hinge," http://www.townsenddesign.com/air.html, pp. 1-2, printed Nov. 21, 2002.
"Your new orthosis," http://www.shrinershq.org/patientedu/orthosis.html, pp. 1-3, printed Nov. 22, 2002.
"3C100 C-Leg® System," http://www.ottobockus.com/products/op_lower_cleg4.asp, pp. 1-2, printed Nov. 22, 2002.
"3C100 C-Leg® System," http://www.ottobockus.com/products/op_lower_cleg4.asp, pp. 1-2, printed Nov. 22, 2002.

* cited by examiner

Phases 0-2

Crossovers required to connect third phase.

Many narrow in-plane gaps subject to shorting

Fig 2 Stator (left) and rotor (right).

| Fine Position | Forward Torque | Reverse Torque |
|---|---|---|
| I | Ph 1+2 | Ph 0 |
| II | Ph 2 | Ph 0+1 |
| III | Ph 0+2 | Ph 1 |
| IV | PH 0 | Ph 0+1 |
| V | Ph 0+1 | Ph 2 |
| VI | Ph 1 | Ph 0+2 |

ELECTROSTATIC ACTUATOR WITH FAULT TOLERANT ELECTRODE STRUCTURE

REFERENCE TO PRIOR APPLICATION

This application claims the benefit of U.S. Provisional Application Ser. No. 60/485,882 entitled "ELECTROSTATIC ACTUATOR WITH FAULT TOLERANT ELECTRODE STRUCTURE" filed Jul. 8, 2003.

FIELD OF INVENTION

The present invention related generally to actuators and, more specifically, to electrostatic actuators.

BACKGROUND

Most actuators currently in use, whether linear or rotary, are based on magnetic forces. The prior art linear actuators (typically solenoids) and rotary actuators (typically motors) require the use of magnetic materials such as iron, causing them to be heavy and unsuitable for applications that require high-power actuators with light weight.

Motors also have the drawback that they operate efficiently at speeds of thousands of RPMs. Many applications require slow speed and high torque, and addressing these applications with electric motors requires additional gears, pulleys or other means to convert the motor's high speed and low torque into the desired low speed and high torque. Addition of gears adds cost, weight, and noise. Gearing also adds significant loading that prevents the output drive from moving freely when the motor is not powered. Some actuator applications, especially those involving muscle augmentation devices, require a low power mode in which the output of the actuator can move freely.

Other actuator applications, such as those based on hydraulics or pneumatics, can provide low speed high torque activation. However, they have severe drawbacks in portability, efficiency and weight due to the extra components needed to compress the working fluid.

Actuators based on electrostatics have been in limited use for over a century. The first electrostatic motors were demonstrated by Ben Franklin and others, but have never before been configured in a way that is suitable for high power applications. They did not find widespread use partially because high-power electrostatic actuators require high voltage electronic circuitry, fine geometries, and designs that are not prone to voltage breakdown.

Electrostatic actuators such as comb drives have been used as micro-actuators in recent devices built from silicon wafers. These actuators are of much smaller scale than the type described in the current invention, and the designs do not tend to scale directly to high power actuators.

One recent design of a high powered actuator was developed by a team led by Prof. Higuchi at the University of Tokyo. That team describes a high-powered linear electrostatic actuator that can lift significant weight. However, the fabrication of this actuator has several drawbacks. It is designed with three interleaved phases driven by high-voltage sine waves 120 degrees out of phase (see prior art FIG. 1). In order to produce high forces, the phase lines must be spaced very close together (a few thousandths of an inch). A single defect of a few thousandths of an inch, whether caused by manufacturing errors, contamination, or gradual breakdown of the dielectric material between the phases, causes the phases to arc over and generate heat that tends to destroy the device.

Another drawback of the Higuchi design is that it uses spaced thin phase conductors to generate the attractive force. The force is proportional to the gap between electrodes on the slider and stator, hence the force is very strong when attracting phases are close to each other, but the force drops off rapidly when they are separated. This effect causes "torque ripple" in which the forces have strong peaks and valleys. The Higuchi group has proposed a solution to torque ripple by skewing the electrodes, but the peak force is then reduced.

Yet another drawback of the Higuchi design is that it requires the high voltage phases to be driven as sine waves. The circuitry for driving the phases with high voltage sign waves is more complex and less effective relative to the circuitry for driving digital signals. Circuitry designed to apply high forces with phases driven at binary high/low voltage levels is simpler and more effective.

Higuchi and others have also developed electrostatic induction motors with a moving electrode that has no connections but relies on induced charge that interacts with the phases driven by the stator electrodes. This type of motor is known to have much lower torque than one in which both rotor and stator have electrodes connected to high differential voltages.

FIG. 2 shows another example of the prior art from FIG. 7 of U.S. Pat. No. 6,525,446. This electrode structure shows drawbacks similar to Higuchi's linear actuator in the earlier example, but in a rotary structure. It has three phases that alternate around the stator, and grounded electrodes that alternate around the rotor. The three phases of stator electrodes, D1, D2 and D3, alternate around the circumference of the stator. The phases must be driven at high voltages in order to provide high forces, and must be spaced with insulated gaps to avoid arcing between the phases. The need for gaps works against the desire to increase the number of phase electrodes in order to increase torque. As the size of the electrodes shrinks, the gaps become a larger fraction of the total circumference. Wider gaps cause the torque to drop off sharply when the rotor is positioned at a point where there is a large distance between the rotor electrode and the active phase. Hence, the prior art actuators suffer from uneven torque and reduced maximum torque. Another drawback of the actuator design in FIG. 2 is the difficulty of interconnecting all like phase lines together. One phase can be connected at the outer diameter and another phase connected at the inner diameter. However, interconnecting the third phase requires each phase line to have a feed through or crossover to avoid shorting the third conductors to one of the other phases. With fine geometries, it may be impossible or very costly to include a plated through hole or crossover for every electrode of the third phase. Hence such actuators require a more expensive manufacturing technique than ones in which the intra-phase connections can be made in the same plane. The undesirable crossovers are evident in the center of the stator in FIG. 2.

Another drawback of the prior art is the need to drive the phases with complex, high-voltage analog waveforms. Higuchi drives the phases with sine waves, and U.S. Pat. No. 6,525,446, drives them with a voltage dependent on the current rotor position. In both cases, the circuits driving the phases need the ability to set phases to arbitrary voltages levels. This requires a more complex circuit than one that generates digital high-voltage pulses by switching the phases between maximum and minimum levels.

SUMMARY OF THE INVENTION

The invention is directed to a new, high-powered electrostatic actuator. In its typical implementation, the actuator comprises alternating stator and slider conductors separated by a dielectric. The dielectric is a substrate made from polyamide, polyester, or other plastic plus a lubricant such as silicone oil, transformer oil, or Fluorinert. The conductors in each layer are separated into n*p separate regions, where p is the number of phases and n is the number of copies of each phase. The phases are separated from each other by ring-shaped gaps to prevent arcing even in the presence of small defects. The electrodes of each phase have a large number of separate elements, and several elements may be missing or shorted without impacting the overall performance of the actuator. The electrodes are configured such that there is a large linear-force region when a phase is activated. This region allows the driving electronic circuitry to generate full-voltage digital pulses instead of carefully shaped sine waves (or other analog waveforms), and it reduces torque ripple. The electrodes in this implementation include capacitive sensors to allow the driving electronic circuitry to determine both coarse and fine position. The fine positioning is used to allow the electronic circuitry to optimally drive the phases even in the presence of external forces that constrain or augment the motion of the actuator. The coarse sensor can be used as a position feedback for the control system coupled to the actuator in order to determine which phase to activate.

Another characteristic of the electrode design in this implementation is that of self-alignment when a single phase is driven. This feature helps to keep the actuator properly aligned during normal operation, and can be used during construction to precisely align multiple stator and rotor layers just prior to attaching them to each other and to the supporting structure. This self-alignment relaxes the manufacturing tolerances requirements and allows finer geometries that generate higher forces than would otherwise be possible.

In this new electrostatic actuator, the moving element has, advantageously, only a single connection to ground, as compared to earlier electrostatic actuators. This connection can me made through a conducting bearing or bushing. No brushes, wires or other connections are needed to connect to the moving element.

The design is tolerant to manufacturing defects in the patterning of the electrodes. Wide spacing is used for the circular gaps between phases, and narrow spacing is used between elements of the same phase. Patterning defects that cause adjacent radial electrodes to be connected do not cause arcing or shorting of the driving electronic circuitry; they only cause a negligible power loss. This is unlike other designs where adjacent radial conductors are connected to different phases, and a single short disables the actuator and renders it unusable.

This new electrostatic actuator device provides more power than electrostatic induction motors. Unlike electrostatic induction motors that depend on residual charge induced in the moving element, this actuator depends on the force generated by the electrostatic field induced by the sequencing phases.

This particular design balances the force generated by the phases by n repeats of p phases in a progression such as 0-1-2-2-1-0. In a design with three phases, for example, the first, second and third phases each have two instances in the active area. The two instances of the first phase are located one at the inner circle (at the shortest radius from the center) and one at the outer circle (at the longest radius from the center). The two instances of the second and third phases are located at intermediate circles (at intervals between the inner most and outer most circles).

The actuator can be build from single-sided flexible circuits or conductive ink on an insulator. No plated through holes are required in the construction of this actuator.

When constructed from single-sided circuits, a first embodiment has a covering film on the rotor and stator electrodes. Glass spheres are used to maintain rotor to stator spacing with little frictional drag.

In a second embodiment, the rotor and stators are constructed without insulating layers, but both the rotor and stator include patterned circular spacer rings with small contact area to minimize frictional drag. The spacer rings can be plated conductive surfaces, or a patterned liquid photo imageable (LPI) coverlay such as the TAIYO PSR-9000A0 Series LPI.

In a third embodiment, the actuator uses two-sided circuits, but requires a minimum of just one feed through connection per phase to interconnect like phases on opposite sides of the flexible circuit. The rotors are constructed without insulating layers in order to reduce the rotor-stator spacing to increase power or reduce the required voltages.

The electrode design has inherent self alignment. When a phase is driven the rotor and stator plates have forces that try to align them with all of them centered on the same axis. This reduces the forces on the bearing, and can be used in manufacturing to perform alignment before permanently attaching rotor layers and stator layers to each other.

An important aspect of the invention is to provide a way for multiple stator and rotor films to be layered, and to connect like-phases between the layers. Three techniques are suggested for making connections between layers of single-sided films. The techniques include rotated tabs with a spiral top layer interconnect, drilled holes filled with a conductive material, and pins inserted through slits cut in conductive pads.

To recap briefly, in accordance with the purpose of the invention as embodied and broadly described herein, an electrostatic actuator typically includes: a stator plate, a rotor plate and an insulating medium. The stator plate has a stator electrode layer with an electrode layer layout in which the stator electrode layer is separated into p*n regions, for "p" phases and "n" instances of the p phases, where 'n' is 1 or any even number equal to or greater than 2. The regions are separated from each other by a region gap, where each instance includes p regions each of which being connected to a respective one of the p phases and electrically insulated from the other regions by the region gaps. The regions are formed as concentric rings separated by the region gaps which are also ring-shaped. Alternatively, the regions are lined up substantially parallel to each other.

The rotor plate, which is stacked above or below the stator plate, has a rotor electrode layer with an electrode layer layout substantially similar to that of the stator electrode layer, but with all its regions being electrically tied to a single source of voltage or ground. The insulating medium separates between the stator and rotor plates.

Notably, each of the regions in the stator and rotor plates is formed with a plurality of electrodes arranged with electrode gaps therebetween, wherein the region gaps are larger than the electrode gaps. The plurality of electrodes in each region are electrically tied to each other. The p phases are driven in succession, where the order of succession determines in which direction the rotor plate moves relative to the stator plate.

A capacitive coarse position sensor is formed integral to the stator and rotor plates or in a plate separate therefrom. Likewise, a capacitive fine position sensor is formed integral to the stator and rotor plates or in a plate separate therefrom.

Finally, the electrostatic actuator can be formed with a plurality of plate groups each having an instance of the stator plate, rotor plate and insulating medium. The plate groups are stacked on top of each other and form a multilayer actuator.

As can be understood from these examples, by introducing the upload security capability to the system, the present invention makes the content sharing more useful, secure and user friendly. Such advantages will be appreciated by those of ordinary skill in the art from the description and practice of the invention disclosed herein.

BRIEF DESCRIPTION OF THE DRAWINGS

The accompanying drawings, which are incorporated in and constitute a part of this specification, illustrate embodiments of the invention and together with the description serve to explain the principles of the invention. Wherever convenient, same or similar numbers or designations are used throughout the drawings to refer to the same or like elements.

DETAILED DESCRIPTION OF THE INVENTION

Actuator and Controller System

Figure 1:
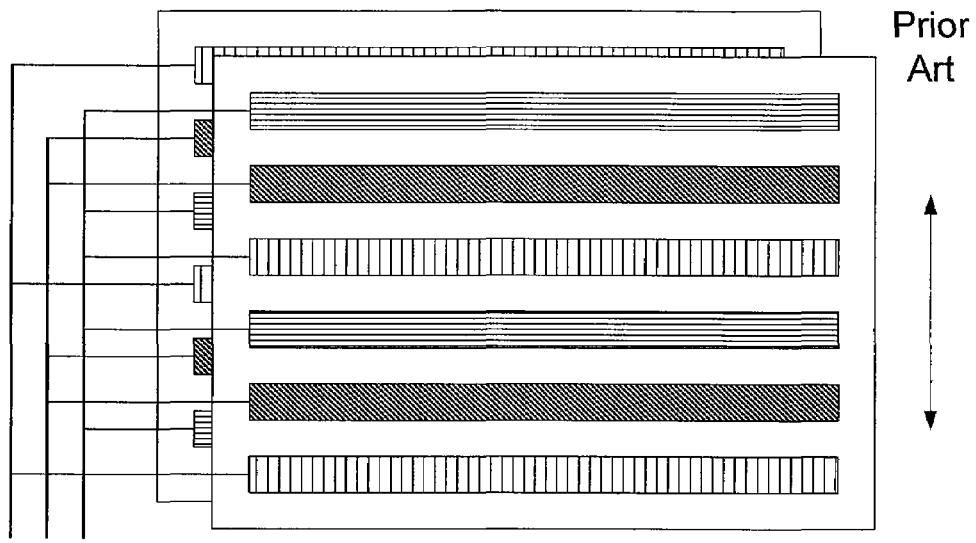
FIG. 1 shows an example of electrode layout for prior art electrostatic linear actuators.
Figure 2:
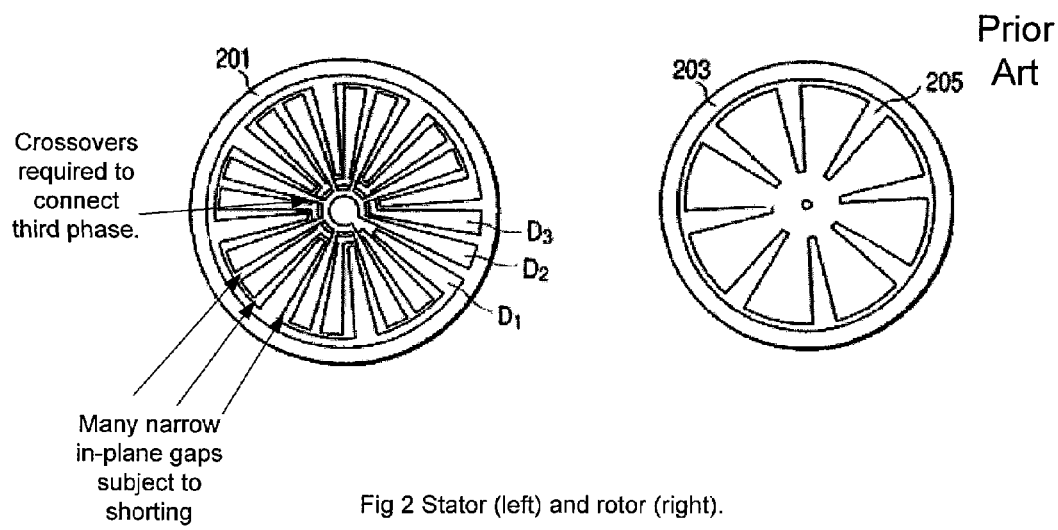
FIG. 2 shows an example of electrode layout for prior art electrostatic rotary actuators.
Figure 3:
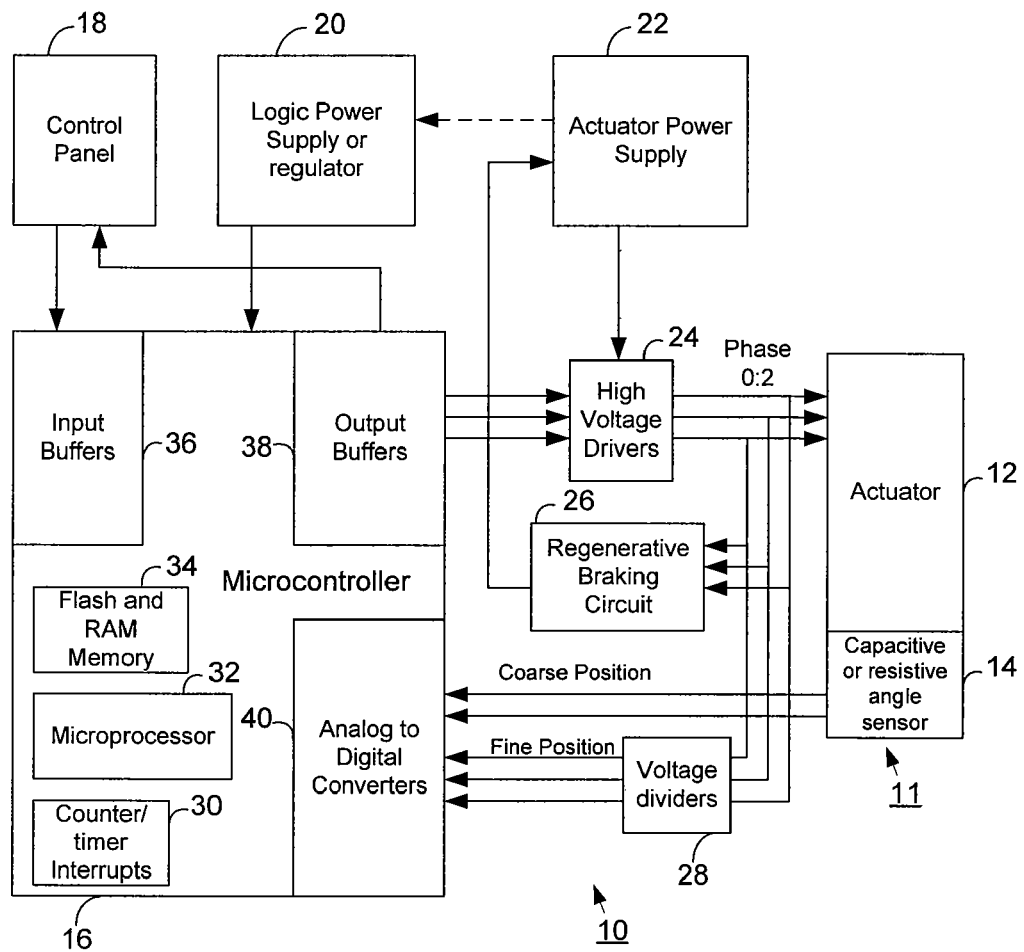
FIG. 3 is a block diagram of the electrostatic actuator assembly with the control system in accordance with the purpose of the invention.

FIG. 3 is a block diagram of the electrostatic actuator assembly with the control system in accordance with the purpose of the invention. A power supply 22, typically a battery pack, supplies power to a microcontroller 16 that controls the operation of the actuator. The microcontroller 16 collects from the capacitive or resistive angle sensors 14 feedback information on the fine and coarse position of the actuator, and supplies control information that is used to drive the phases (0:1:2) with high voltages. A high voltage driver circuit 24 includes means for generating high voltages to drive the phases in response to low voltage control signals from the microcontroller. The high voltage circuit may also optionally include a regenerative braking circuit 26 to return power to the batteries 22 when the actuator 11 is driven by an external force.

The fine position sensor, to be discussed more fully later, has a voltage divider circuit 28 to allow the microcontroller 16 to monitor the phase voltages. Thus the microcontroller can cause a phase to be driven by a high voltage while monitoring its voltage level. This allows the microcontroller to determine the capacitance of a phase by first driving the phase to one voltage, and then measuring the voltage decay after a defined time interval. The measured voltage is determined by the RC time delay of the phase capacitance and the voltage divider resistance 28. The capacitance measurement is used to determine current position to help determine when to switch between phases as the actuator moves either under its own force, or due to an external force. This allows the driving electronic circuitry to apply force in the correct direction regardless of the position of the rotor.

The actuator preferably also has a coarse position sensor to allow the current angle of rotation to be determined. The coarse sensor may be a capacitive, optical or resistive sensor that is part of the actuator or is added on to the actuator.

The microcontroller 16 is optionally also connected to switches (not shown) to allow user input to determine the desired actuator motion, and a display to show information such as the speed, torque, and battery condition. These measurements can be displayed as instantaneous, averaged, peak or logged values.

Theory of Operation

Figure 4:
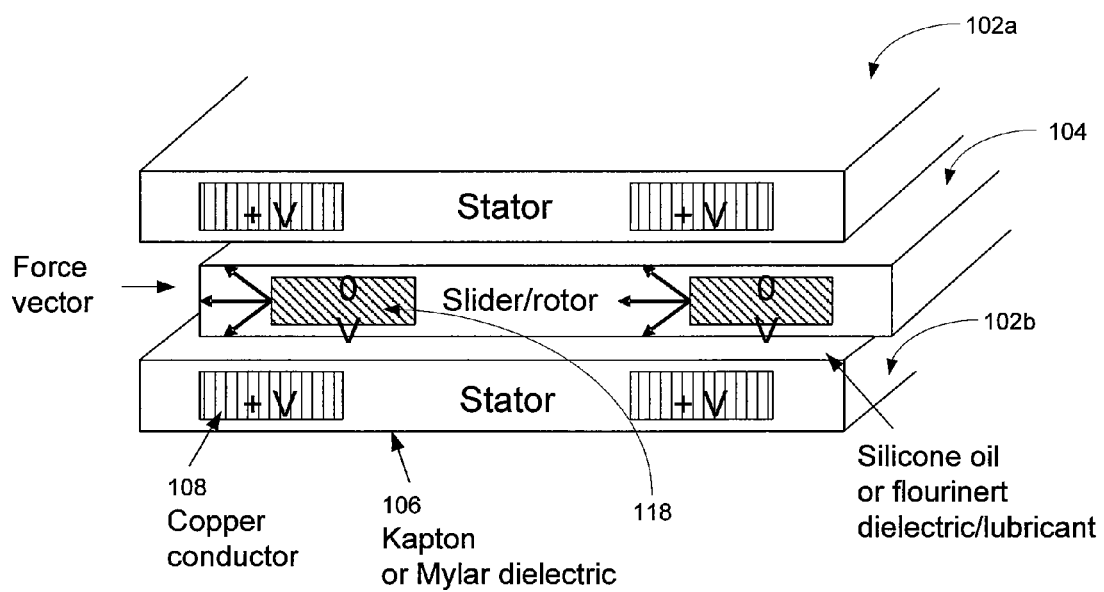
FIG. 4 is a diagram showing the direction of forces between a single slider/rotor electrode and a pair of stator electrodes.

FIG. 4 illustrates the basic theory of operation with a cutaway view of a moving electrode 104 between a pair of stationary electrodes 102a,b. This drawing illustrates the operation of either a linear motion slider, moving left and right, or a rotary electrode rotating about the center of rotation away from the viewer. The following discussion will describe only the rotary case, but linear actuators follow similar principles.

The rotor electrode 104 is grounded (or tied to a voltage level other than ground) while the stator electrodes 102a,b are driven to a high voltage. The voltage limit depends on the breakdown voltage of the insulation between the electrodes, but for the geometries of interest in this structure, the voltage is generally in the range of 1 to 4 KV. The dielectric 106 may be formed from insulating layers on the rotor and/or stator as well as a dielectric fluid between the layers (not shown). The fluid may be silicone oil, fluorinert, or other non-conducting fluid. In some cases, with appropriate driving voltages, no dielectric fluid is required.

When the high voltage is applied, the rotor electrode 104 is attracted to the upper stator 102a electrode and to the lower stator electrode. The upward and downward forces roughly cancel, but the forces of the fringes of the electric field act to pull the rotor electrode farther into the gap. Multiple phases (not shown) each pull the rotor a portion of the rotation. With three phases, there is always at least one phase that pulls the rotor clockwise, and another one that pulls it counter-clockwise. (Depending on the relative positions of the rotor and stator, the third phase may be at the position where the stator and rotor plates are aligned, and powering the phase would not move the rotor in either direction, or activating the third phase may aid movement in one of the directions.)

When the end of a rotor plate is between stator plates, a force pulls the plate farther into the gap. The force exerted by the field is roughly constant and independent of the slider (rotor) plate is positioned between the stator plates. The current invention makes use of this linear force region to reduce torque ripple.

Electrode Design

Figure 5:
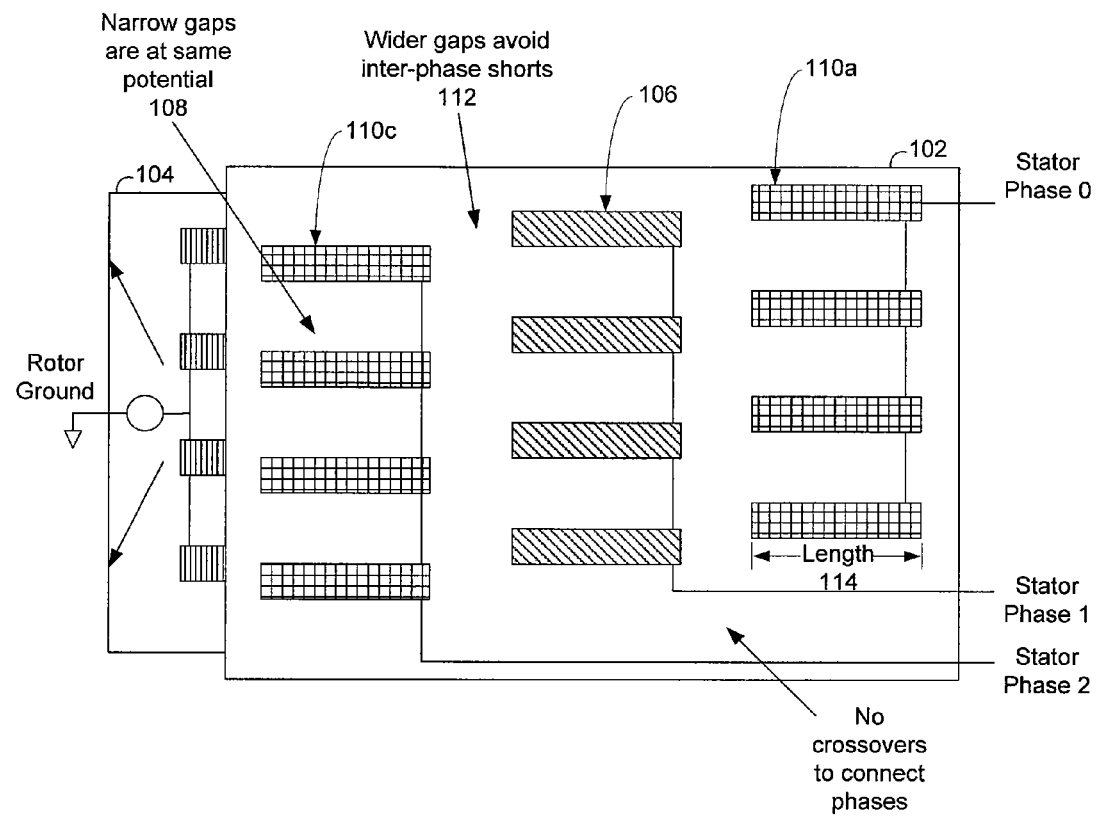
FIG. 5 shows the electrode layout in accordance with the principles of the present invention.

FIG. 5 shows a portion of a rotor electrode 104 under a stator electrode 102. The stator is powered with three phases, with each phase driven a different radial distance from the center of rotation. The phases are offset from each other, and the voltages can be sequenced to drive the rotor in either direction. Note that with this electrode arrangement, the narrow gaps 108 are all between electrodes 110a-c of the same phase, driven at the same voltage. Any small defect that would cause a short or open would not cause arcing or shorting out of the electronic circuitry. The gaps 112 between phases can be made much larger with very little impact on performance because the number of phases (and hence number of large circular gaps) is small compared to the number of radial electrodes with small radial gaps. The number of radial electrodes may typically be several hundred, while the number of inter-phase gaps is just five for the preferred structure.

As further shown in FIG. 5, the simplest case involves three phases in a progression 0-1-2 from outside to inside. Note that if each phase had the same radial length 114, the outside phase (0) would pull more strongly because its torque is proportional to its distance from the center. The unequal torque could be compensated by making the phases progressively larger towards the center.

Figure 6A:
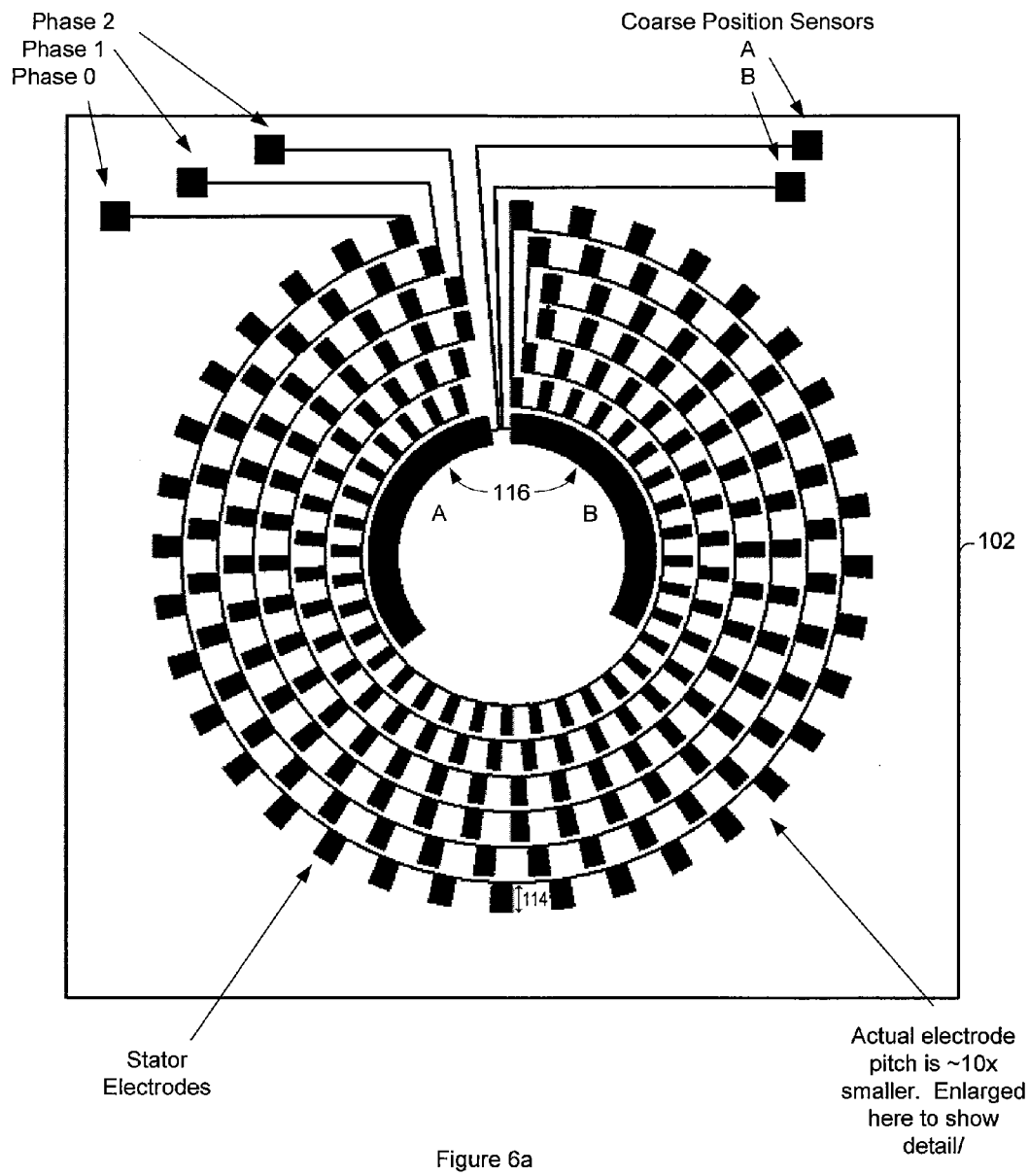
FIGS. 6a and 6b show the electrode and sensor layouts for stator (6a) and rotor (6b) film plates of a rotary actuator configured in accordance with the principles of the present invention.

FIG. 6a shows a simpler technique in which there are two copies of each phase alternating in the progression 0-1-2-2-1-0 from outside to inside. Phase 0 has both the strongest (outside) electrodes and weakest (inside) electrodes. It can be shown that this arrangement produces the same torque from all three phases when all the phase elements have the same radial length. The same technique could be used for more phases, for instance 0-1-2-3-3-2-1-0, or for more repetitions of each phase such as the sequence 0-1-2-0-1-2-2-1-0-2-1-0. To provide equal torque for each phase, the sequence from outside to inside must be the same as inside to outside, and there must be the same number of copies of each phase.

FIG. 6a also shows the stator 102 with electrode pitch large enough to be easily seen. In practice the electrodes may have minimum geometries of a few thousandths of an inch, with hundreds of phase elements circling the stator. The radial gaps between phases can be made as large as necessary to avoid the possibility of shorting or arcing. Also note that connection to the pads requires no feedthroughs or crossovers.

Figure 21:
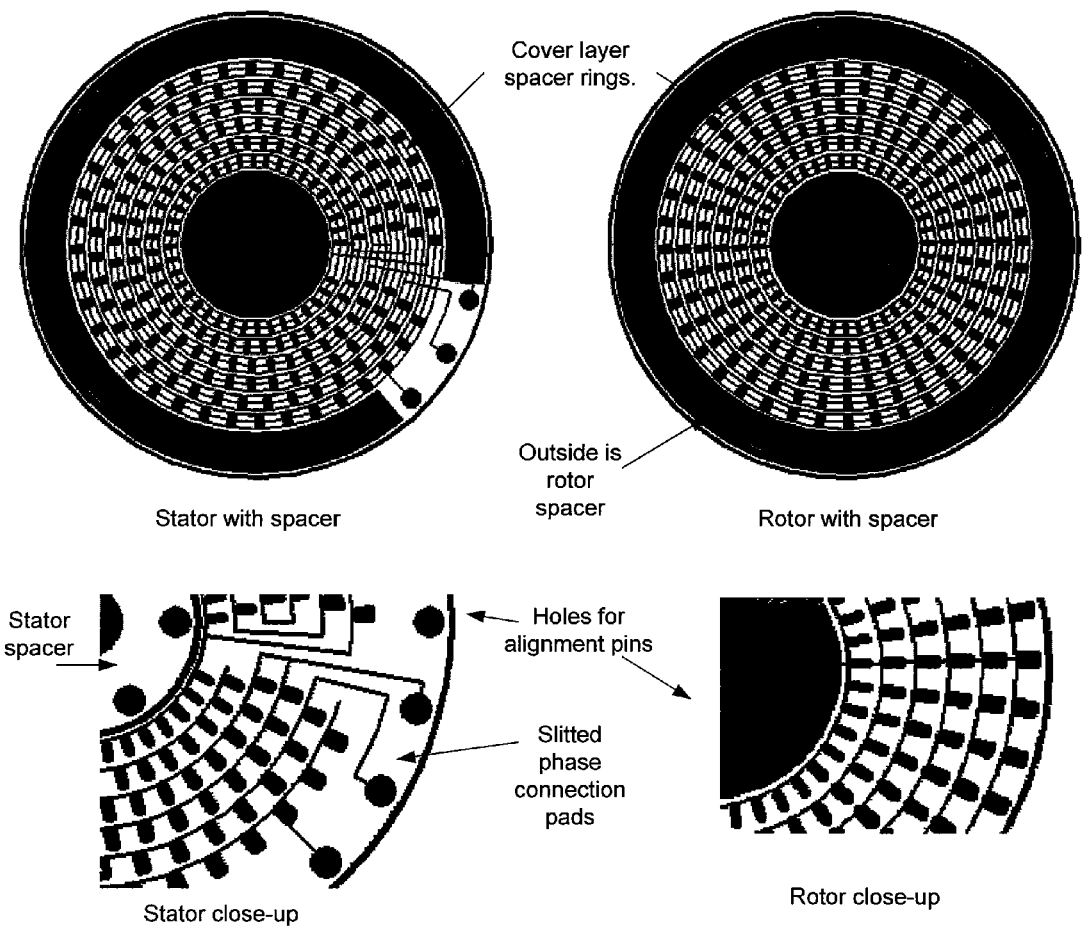
FIG. 21 shows the electrode layout, mounting holes, cover layer spacer rings and slitted pads for the rotor and stator of an embodiment of the invention.

FIG. 6a further includes coarse position sensors A and B that form variable capacitors with moving grounded elements on the rotor. These sensors are shown as a ring located at the inner circle in an (inactive) area that would otherwise not be used for phase-driven electrodes. In an alternative embodiment of a layered structure, one layer is dedicated to the coarse position sensor instead of adding the inner ring on every layer. Such a dedicated coarse sensor layer allows the coarse sensor ring to be omitted from the alternating rotor and stator layers(as illustrated in FIG. 21).

Figure 6B:
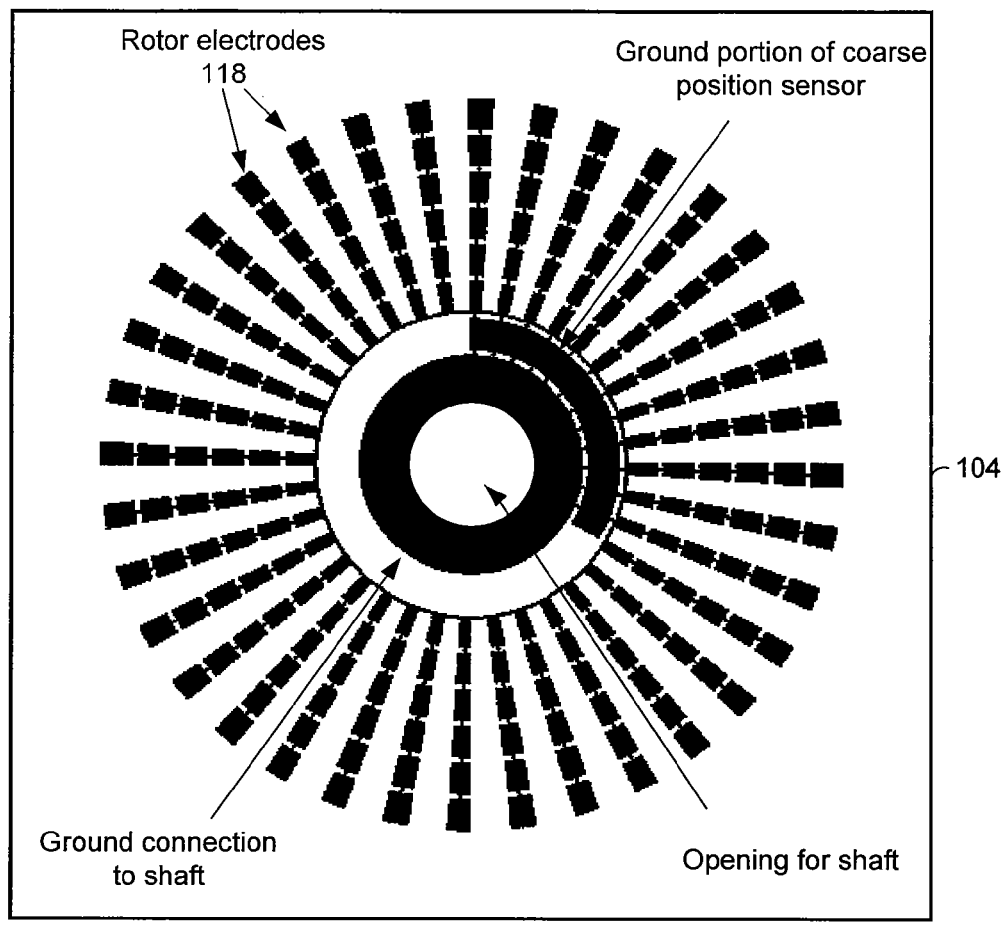

FIG. 6b shows the rotor electrode design intended to be used with a stator of the type shown in FIG. 6a. All elements of the rotor are tied together to a single voltage. While the rotor voltage is designated as "ground", it need not actually be tied to earth ground, and can be set to any fixed voltage level, with the torque determined by the difference in voltage from this electrode and the driven phase. Henceforth, "ground" is used to designate this arbitrary rotor voltage.

The rotor in this configuration is shown with 36 rotor electrodes arranged around the circumference. Thus, each conductive electrode 118 covers approximately 3.33 degrees of the circle and the gap angle between adjacent electrodes is about 6.66 degrees. However, it is actually advantageous to make the gap angle less than twice the electrode angle. Making the angle covered by the conductor wider than 1/p of the phase pitch allows the driving electronic circuitry to drive each phase slightly more than 1/p of the time. This assures that there is some overlap in driving the phases and makes the application of torque continuous. The limit to the maximum angle covered by each electrode is that the gap angle must be greater than the electrode angle to avoid the situation where opposite sides of the rotor electrode are attracted to different instances of the same stator phase. Hence, for p phases, and assuming electrode angle E and gap angle G, the following equation should hold:

$$(p-1)*E > G > (p-2)*E.$$

With 3 phases, for example, this reduces to:

$$2E > G > E.$$

The same equations apply to both the stator and rotor electrodes. In this design, the electrode angle E is the same for the rotor and all stator phases.

To allow the maximum manufacturing tolerance, it is best to pick a gap angle G close to midway between the limits, for instance, G=1.5E. At the smaller diameter (inner ring closer to the center) of the active area, if the rotor phases repeat every 0.010 inches, the width corresponding to the angle covered by each electrode can be set to 0.004 inches and the gap set to cover 0.006 inches. Then, even if the center of the rotor and stator are misaligned by +−0.001 inches, all phase elements will pull in the same direction.

The rotor ground connection may be made by each rotor layer contacting a conducting shaft. Alternatively, the ground connection can be made by having rotor electrodes layers with one or more exposed conductors on both sides of each film plate and connected to the next rotor electrode through a conductive spacer. With the stacked rotor-stator film plates technique, only a single rotor layer or spacer needs to connect to the grounded shaft.

Note that each rotor ring is segmented into shapes that match those of the stator. An alternate design, with the individual segments joined to form a single radial wedge, would provide the same rotary force, but would not provide the same degree of self-alignment. The arrangement shown provides an additional force tending to align the rotor and stator centers.

Figure 7:
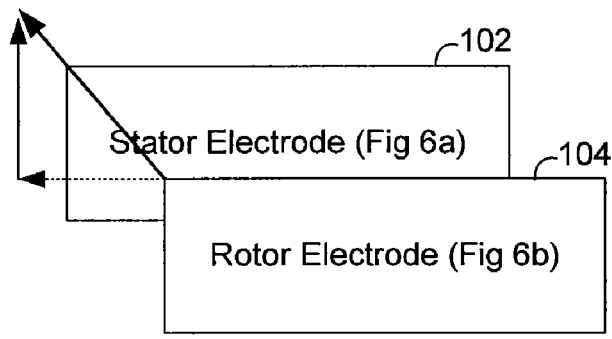
FIG. 7 is a diagram illustrating the force vector that causes self-alignment of electrode plates.

FIG. 7 illustrates the self alignment forces. The electrostatic force acts in the direction that tends to increase the capacitance between rotor and stator electrode layers. The force vector tends to be directed to precisely align the two electrode layers, acting in both the X and Y directions. In the geometry of FIGS. 6a and 6b, the main driving force on each electrode is to pull the rotor about its center axis. However, segmenting the radial electrode wedges of the rotor to match the shapes of the stator electrodes produces a radial force that tends to align the center of the rotor and stator electrode layers. The radial force is proportional to the number of electrode rings, and the force can be increased by increasing the number of rings. Note that the self-alignment restoring (centering) force would not have been present with the stator design of FIG. 6a if the rotor were designed with continuous wedges instead of segmented wedges connected by narrow conductors. The rotor wedges themselves must be tied and connected to ground. FIGS. 6b and 21 show the radial and circular connections of the wedges. Either technique can be used, but the radial technique affords some advantage in providing a smooth circular ring to help maintain spacing between rotor and stator, The self-alignment centering force is useful in normal operation to relieve the stress force on the center bearing. This force can also be used in the manufacturing process to increase the precision of rotor to stator alignment. If the holes in the rotor or stator are larger than the alignment pins, the film plates can be moved slightly. After assembly, high voltage is applied to one of the phases to pull all the rotor and stator electrodes (and plates) into precise alignment. At that point, the film plates can be held in position by a tightening means of one type or another. Examples of tightening means include screws, an adhesive that is allowed to cure, and solder-covered pins that are heated to allow solder to flow between the pins and the plates, and then cooled to form a solid bond. In this way, the final alignment can be more precise than the sum of the tolerances of individual rotor, stator, and housing components.

On each stator, the electrodes are designed with wide enough circular rings separating the phases. IN addition, a vertical gap separates between the rotor and stator electrode layers. This gap is formed by insulation layers on at least one of the rotor or stator film plates and it may include a dielectric fluid in between the layers. The insulation layer is formed by a film coverlay or by an evenly applied liquid coverlay to minimize the possibility of insulation gaps. Any gaps are filled with dielectric fluid and there may be a second dielectric on the adjacent layer to increase high voltage resistance, thereby reducing the chance of arcing.

The rotor and stator film plates are typically built from films such as Dupont Kapton, Mylar or other flexible circuit materials with a base material thickness of 0.001 to 0.005 inches. The thin electrodes allow many of them to be layered in a small volume. Depending on the torque requirements, actuators can be built with just a few rotor and stator layers, or with as many as a hundred or more layers.

Figure 8:
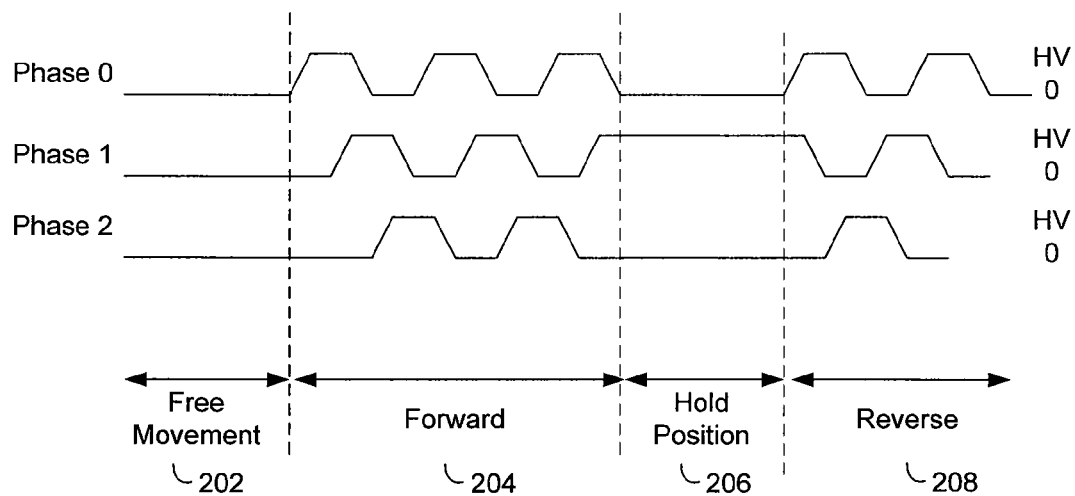
FIG. 8 is a timing diagram that shows the phase voltages for different modes of operation.

FIG. 8 is a timing diagram showing waveforms for driving the phases. Each stator phase is driven between two values, with the "0" value indicating a voltage equal to the rotor voltage, and the "HV" indicating a high positive or negative voltage with respect to the rotor voltage. At first, all three voltages are shown at 0 indicating a mode where the actuator is not powered and no forces are generated between the rotor and stator. This mode 202 allows free movement of the rotor when the actuator is not powered. This is important in applications where it is desirable to have an actuator mode that does not restrict movement and where the mechanism can be freely back-driven by an external force. This mode is not available in earlier actuators that use reduction gears to generate high torque from a high-speed, low-torque motor.

In the next mode 204, the actuator is powered where the three phases are sequentially driven in the 0-1-2 order for producing forward motion. The phases are cycled between two voltage levels, with some rise time delay. As mentioned, the actuator phases are arranged to allow some overlap where two phases are simultaneously driven. This is advantageous because it allows continuous high-torque even when the motion is extremely slow. With electrodes following a G=1.5E rule, each electrode is driven 'on' for 40% of the cycle and 'off' for 60% of the cycle. Because of the overlap, during 75% of the cycle a single electrode is powered and during the remaining 25% of the cycle two electrodes are powered. During the time when two phases are driven, the high voltage level can be reduced to a level where the torque is equal to the torque produced when only a single voltage is driven.

Continuing with FIG. 8, the "Hold Position" is a mode 206 entered when a single phase is driven and used to hold the actuator in position. This position is a particular point of rotation where the electrodes of one stator phase are lined up with the rotor electrodes, and movement in either direction is resisted by the induced field.

The next mode 208 shows reverse operation. In the reverse mode, the phases are driven sequentially in reverse, e.g., in the 2-1-0 order.

Mechanical Assembly of the Actuator

Figure 9:
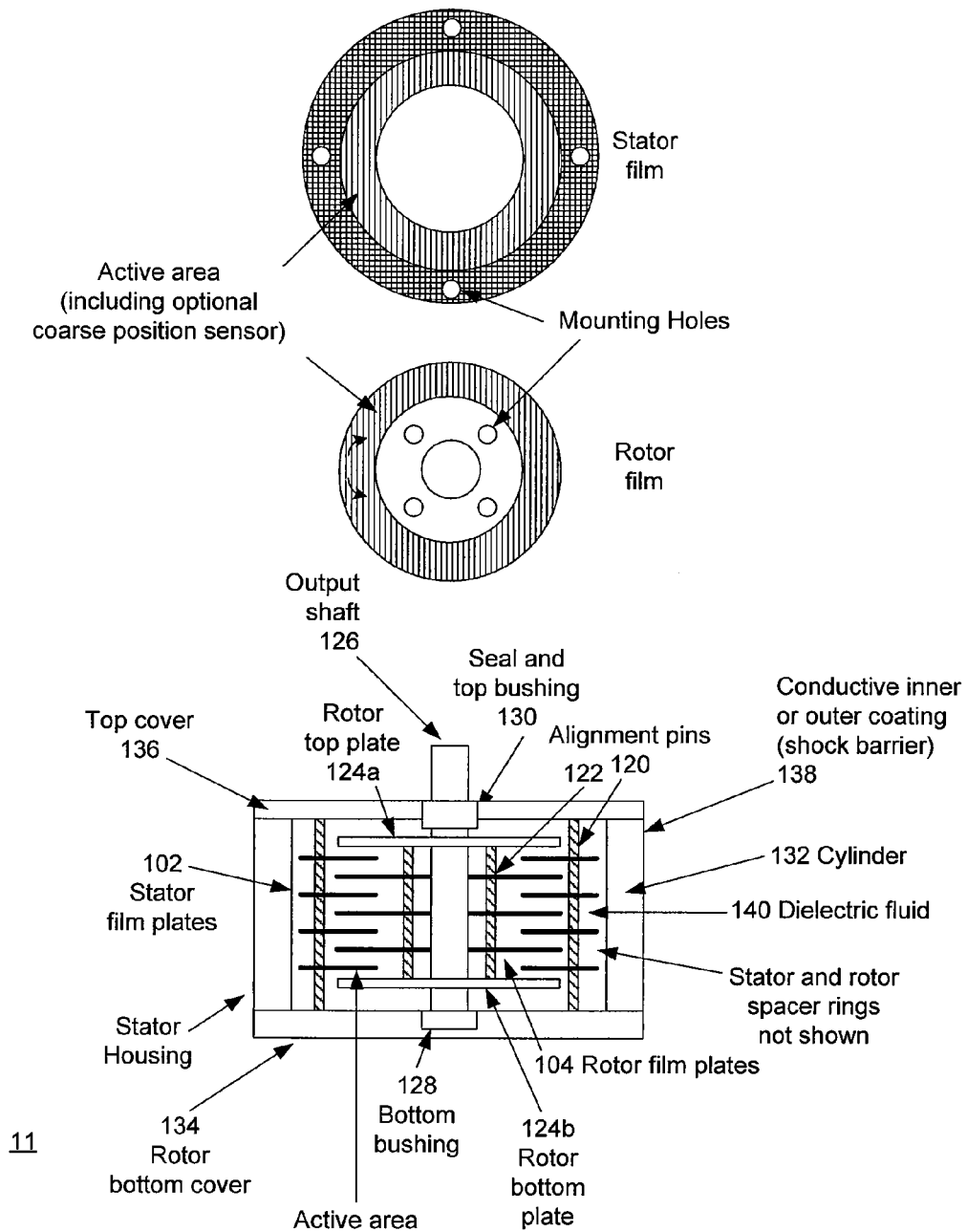
FIG. 9 is a diagram of the mechanical actuator assembly showing the layering of rotor and stator film plates and the central shaft for mechanically delivering the rotation force.

FIG. 9 shows the mechanical configuration of the actuator assembly 11 for enclosing the electrodes and delivering mechanical output power. The stator and rotor film plates 102, 104 are stacked alternately. The stator plates have holes for alignment pins 120 that also serve as the mechanical coupling to the housing. These holes 120 are located in this configuration close to the outer perimeter of the stator. The rotor plate has holes closer to the center of the plate for alignment pins 122 that couple to top and bottom rotor plates 124a,b. In turn, the top and bottom rotor plates 124a,b are coupled to the shaft 126. The shaft is supported by upper and lower bushings 128, 130 or bearings. Output power is taken from the shaft.

To form the housing of the actuator assembly 11, an outer cylinder 132 is coupled to a bottom cover 134. The mechanical assembly of the actuator is made in phases, starting with connection of the bottom cover 134 to the cylinder 132. The mechanical assembly continues with insertion of the shaft 126 into the bottom bushing 128, connection of the stator alignment pins 120 to the bottom cover 134, and connection of the rotor alignment pins 122 to the rotor bottom plate 124b that is coupled to the shaft 126. At this point, the electrode film plates can be added. A stator film plate 102 is the first plate to be inserted, over the stator alignment pins 120, and then a rotor spacer film plate is inserted over the rotor alignment pins 122. Next a rotor film plate 104 is inserted over the rotor alignment pins 122 and then a stator spacer film plate inserted over the stator alignment pins 120. This sequence repeats for the desired number of layers, finishing with a final stator film plate. There may be two additional layers for a coarse position sensor, if this function is not included in each rotor-stator pair. Once all of the film plates are stacked, the top rotor film plate 124*a* is inserted over the alignment pins 122 and shaft 126. To complete the housing, the top cover 136 is connected to the cylinder 132 and stator alignment pins 120. The actuator assembly 11 may be tightened with screws or adhesive. The various mechanical parts of the actuator may be made out of plastic, aluminum, or other suitable material. Generally, if the actuator housing is non-conductive, an inner or outer layer of conductive paint or coating is added and connected to ground potential. This conductive layer 138 provides an added barrier to electric shock in case the cylinder is damaged while the electrodes are powered.

The actuator housing is designed to contain the dielectric fluid. This fluid is silicone oil, transformer oil, Fluorinert, or any other suitable fluid. A seal 130 allows the shaft to rotate without allowing the dielectric fluid to escape. In some applications, where lower power is required, no fluid may be necessary.

Figure 10:
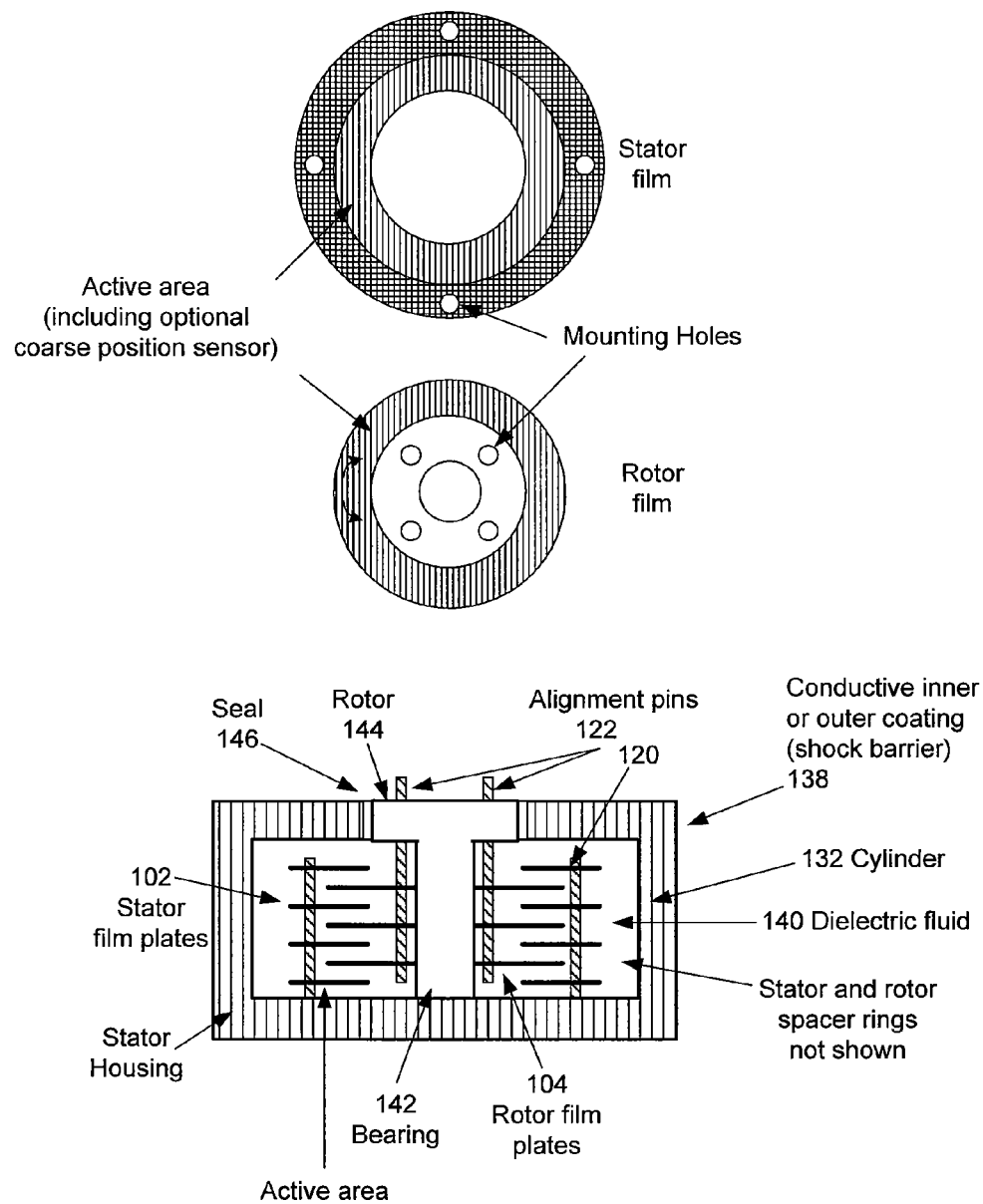
FIG. 10 is a second embodiment of the mechanical actuator assembly.

An alternative mechanical assembly design is shown in FIG. 10. The primary difference is that the mechanical output power (for rotation) it taken directly from the rotor alignment pins 122 instead of the shaft. This design has a larger seal 146 around the rotor output plate 144.

Yet another actuator assembly, not illustrated in a figure, is designed with a shaft cross-section shaped as polygon rather than being round. The polygon shape is, for instance, a triangle, a square, or a hexagon. The rotor and stator film plates have the same polygon-shaped cutout in the middle, and are placed over the shaft. In this way, the film plates are aligned and the output power is mechanically coupled directly from the film plates to the shaft.

Position Sensing

Many motors and rotary actuators have sensors for the speed or angular position. Such sensors may be optical, magnetic, or capacitive. The sensors are used as part of the feedback for the control circuits.

Figure 11:
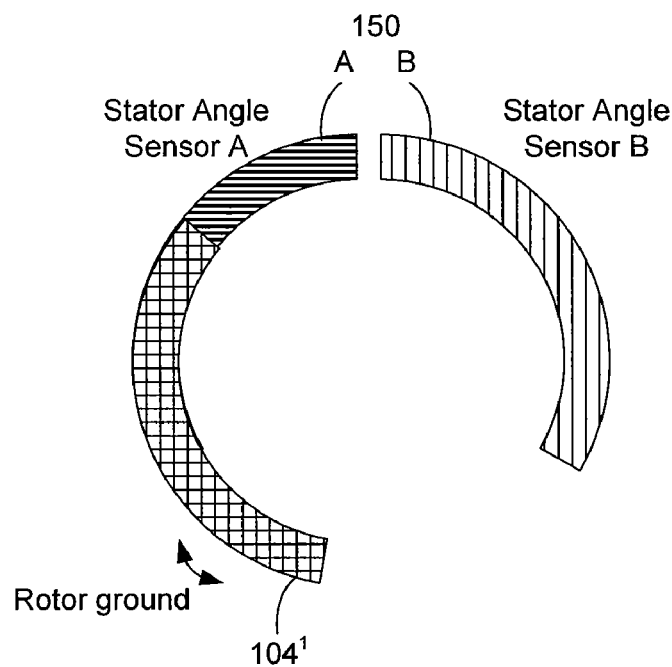
FIG. 11 is a diagram of the coarse position sensor including a graph showing how two capacitance measurements uniquely determine the coarse position.
Figure 11:
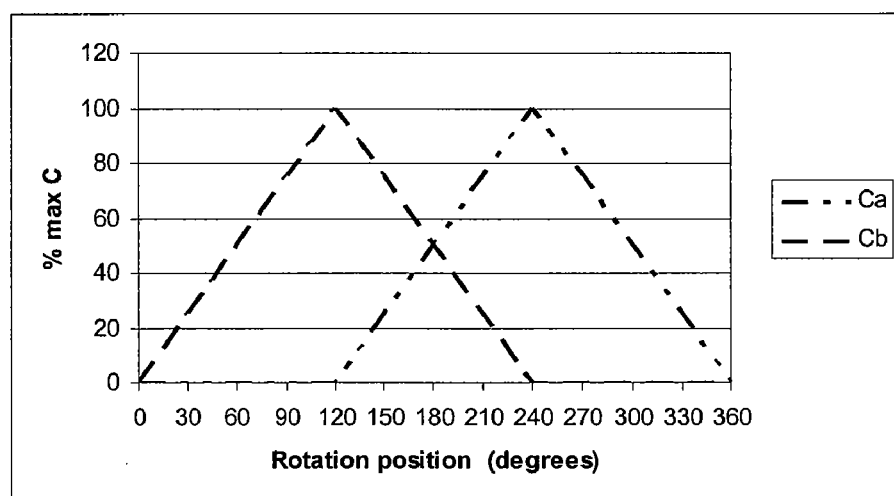

An actuator configuration in accordance with the present invention can avoid a separate position sensor by including a capacitive sensor directly on every film plate, or it can be configured with an additional single capacitive sensor layer plate. FIG. 11 shows the operation of the capacitive sensor. The A and B electrodes 150*a,b* of the capacitive sensor are attached to the stator and each covers approximately 120 degrees of the circumference. The ground electrode of the capacitive sensor is coupled to the rotor and also covers approximately 120 degrees of the circumference. The graph shows the capacitance to ground of the A and B electrodes 150*a,b* as the rotor moves through one full rotation. Then, knowledge of the capacitance between the A and B electrodes and ground provides for uniquely identifying the rotation angle. Capacitance can be measured by the microcontroller (16, FIG. 3) by driving the voltage across the capacitor to a known value, discharging the capacitor through a fixed resistance, and measuring the voltage through an analog-to-digital converter (40, FIG. 3) a fixed time after the discharge begins.

If every layer includes coarse-position capacitive sensor plates, all sensor electrodes may be connected together to increase the magnitude of the capacitive change or a single layer may be coupled to the sensor output terminals. Another choice is to design special rotor and film plates that are used only for the sensor. These film plates can use the entire active area for the coarse position sensing plates (instead of a small inner ring).

Incidentally, the actuator can be deployed in many applications where mechanical lift, rotation or resist forces are needed. Thus, for instance, when the actuator is used in a direct-drive muscle augmentation device, the coarse position corresponds directly to the joint angle.

Figures 12, 13:
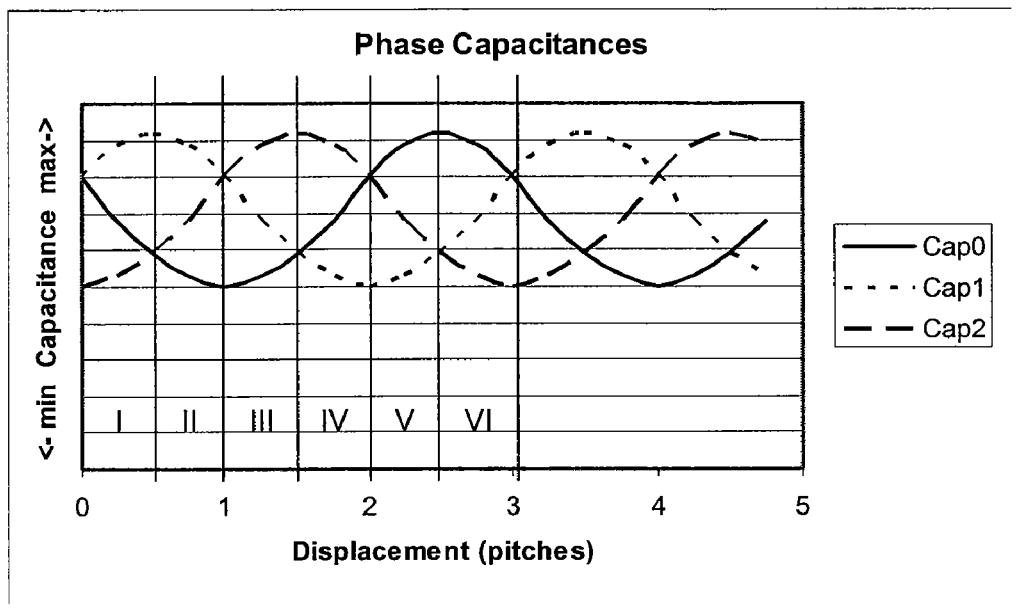
FIG. 12 shows a simulated graph of the phase capacitances at different rotation angles. Any two capacitance values uniquely determine the fine position.
FIG. 13 shows a table that indicates the phases to be driven for forward or reverse operation depending on the current position of the rotor.

The fine position sensor uses the same principle as the coarse position sensor. The fine position sensor provides to the controller a fine displacement indicia which the microcontroller uses to determine which phase to drive in order to produce torque in a desired direction (for altering the displacement). FIG. 12 shows a simulated waveform of measured capacitance to ground of the three phases. The capacitance value graph shows smooth transitions instead of sharp transitions because the fringes of the electrostatic fields dominate the phase capacitances. Capacitance can be measured from phases that are not driven by applying to them a sufficiently low voltage so as not to affect the regular operation of the device (i.e., so as not to interfere with the induced forces), and then by measuring the voltage across a known resistance at a set time after the voltage starts decaying.

FIG. 12 also divides the full rotation into six 60 degree sectors numbered I to VI on the diagram. When less than two phases are being driven, the fine position (sector) at that point can be uniquely determined by two capacitance measurements. When two phases are driven, the fine position at that point can be determined from one capacitance measurement and the previously-determined position.

FIG. 13 is a table showing the phase or phases that should be driven in order to apply torque in a desired direction given the current fine position. For instance, in sector III, driving phases 0 and 2 applies forward torque, and driving phase 1 applies reverse torque. Note that applying a phase voltage always applies torque in the direction of increasing capacitance.

Figure 14:
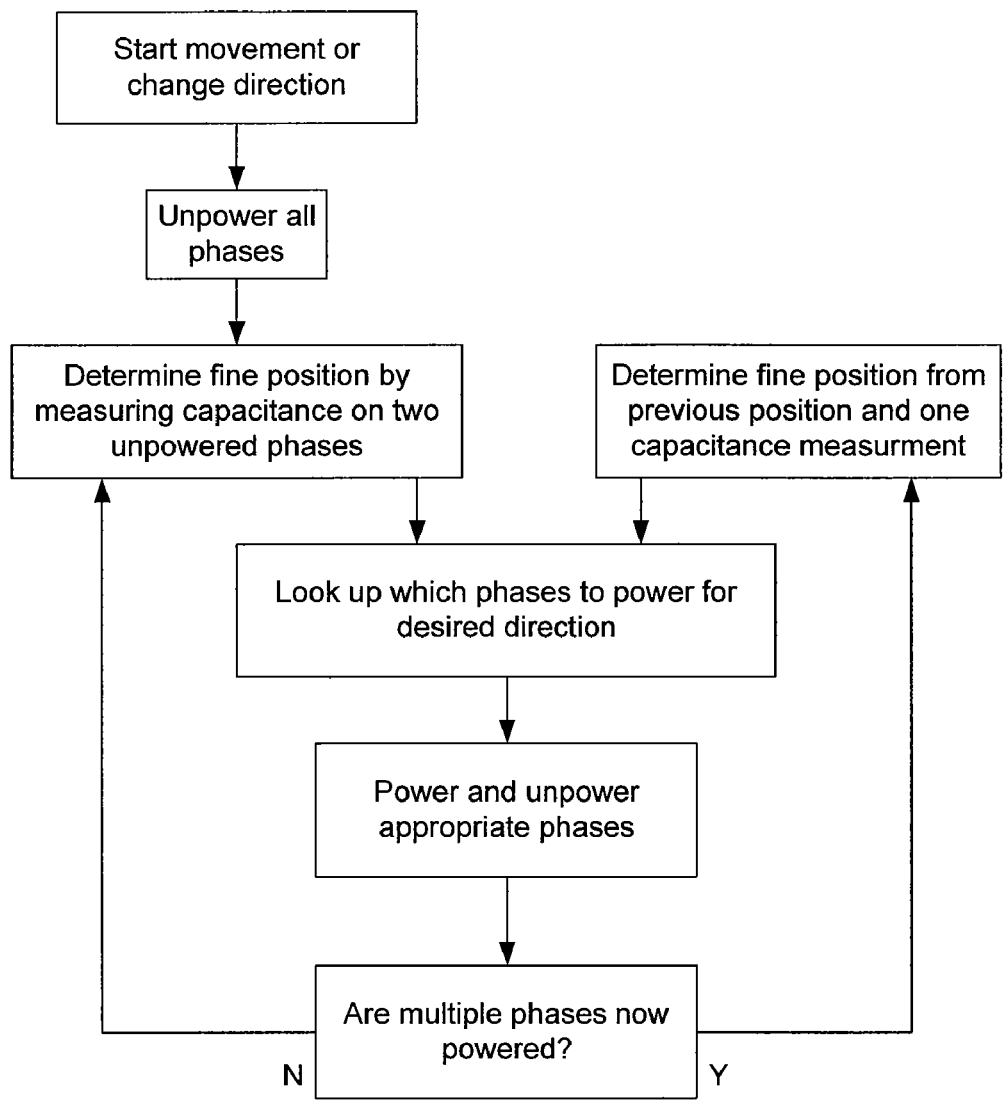
FIG. 14 is a flowchart showing the sequence of steps taken by the controller to apply torque in a desired direction.

FIG. 14 is a flowchart representing the microcontroller algorithm for driving the phase voltages. Starting from an un-powered state (stopped position) or from a point of change in direction of rotation, where none of the phases is driven, the fine position is determined by measuring the capacitance of two phases. At this point the table (in FIG. 13) is used to determine which phases should be driven for inducing torque in the desired direction. Upon applying voltages to drive the phases, if one phase is powered, the other two phases are available for capacitance measurements. When a change in capacitance indicates movement to a new region, the table is again consulted for determining which phases should be driven next.

At the point of operation where two phases are driven, there is only one phase available for capacitance measurements. Such single measurement is not sufficient to uniquely define the fine position However, by knowing the previous position of the rotor, the microcontroller can determine the fine position from a single measurement under the assumption that the position change is slower than the capacitance sampling interval. Once the fine position is determined in this manner, the new fine position region is used to determine which phase to drive next.

Electrode Construction

Figure 15:
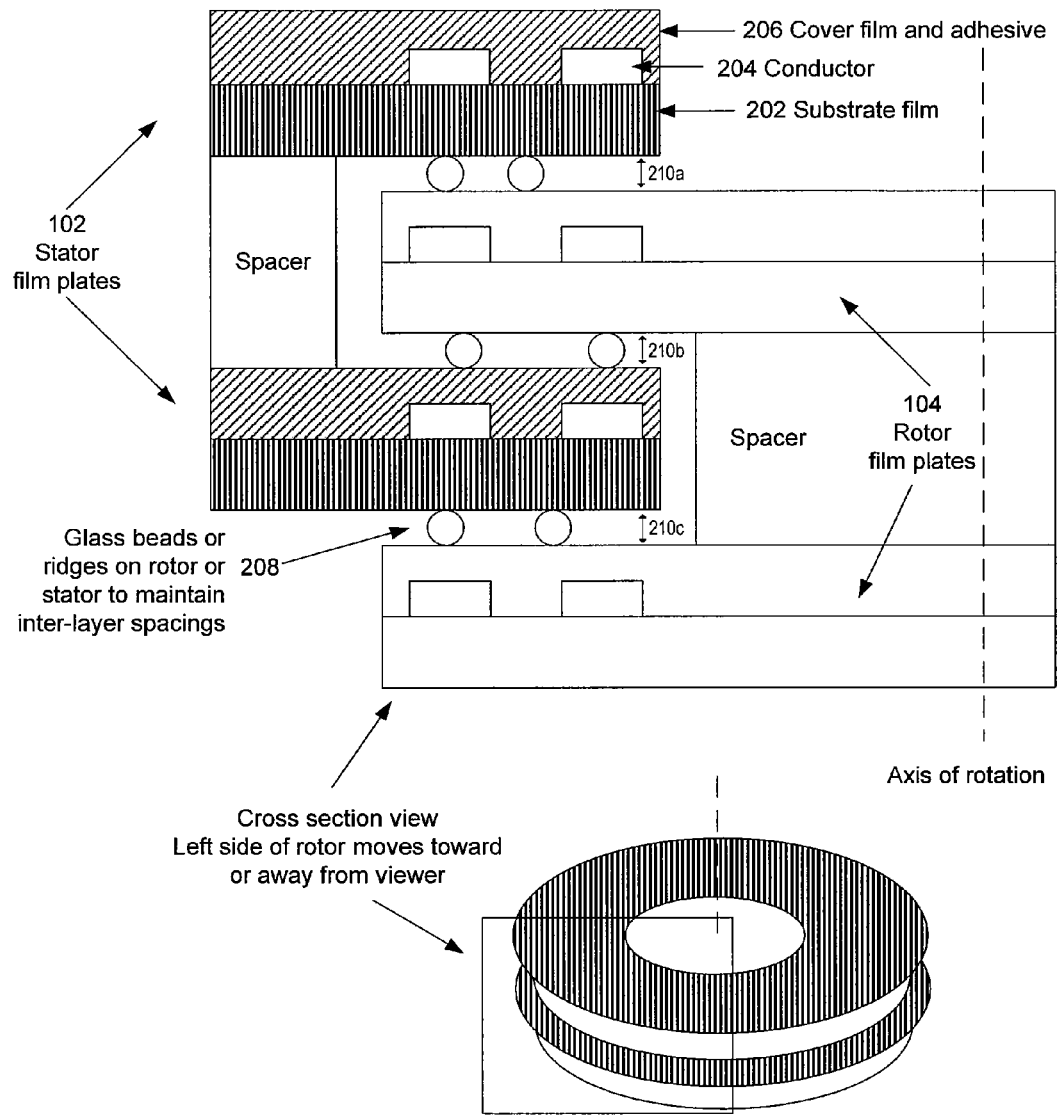
FIG. 15 shows a cross section of single-sided electrodes with glass spheres to maintain spacing.

FIG. 15 shows a close up cross section of rotor and stator film plates constructed from single-sided flexible circuits. Single sided flexible circuits may be constructed using either a subtractive or additive process. The substrate film of the plate 202 is typically made from a polyimide film such as Dupont Kapton, or a polyester film such as Mylar. In a subtractive process, the substrate film 202 is pre-coated with a thin copper layer on one side. Printed circuit processing technology is used to pattern resist over the copper layer, then the unwanted copper is etched away, leaving the desired conductor pattern 204. With an additive process, the desired conductor pattern in is screened or printed onto a non-conductive substrate 202. In this case, a conductive paint or epoxy is used. With either process, the finished pattern 204 may then be covered by a cover layer 206, either using another layer of film or an LPI covercoat. In the single layer construction, the substrate film 202 is the primary insulation between the rotor and stator electrodes. The substrate film must be adequately strong mechanically in order to supply the torque, yet it must as thin enough to allow high electric field strength.

The single-sided electrodes are separated by small glass spheres 208 suspended in the dielectric fluid. These glass spheres keep the distance between the plates even and prevent a rotor plate from being close to one of its neighboring stator plates more so than the other (i.e., $210a \approx 210b \approx 210c$). In other words, the glass spheres prevent frictional drag resulting from unevenness in the forces between the rotor layer and its two adjacent stator layers.

Figure 16:
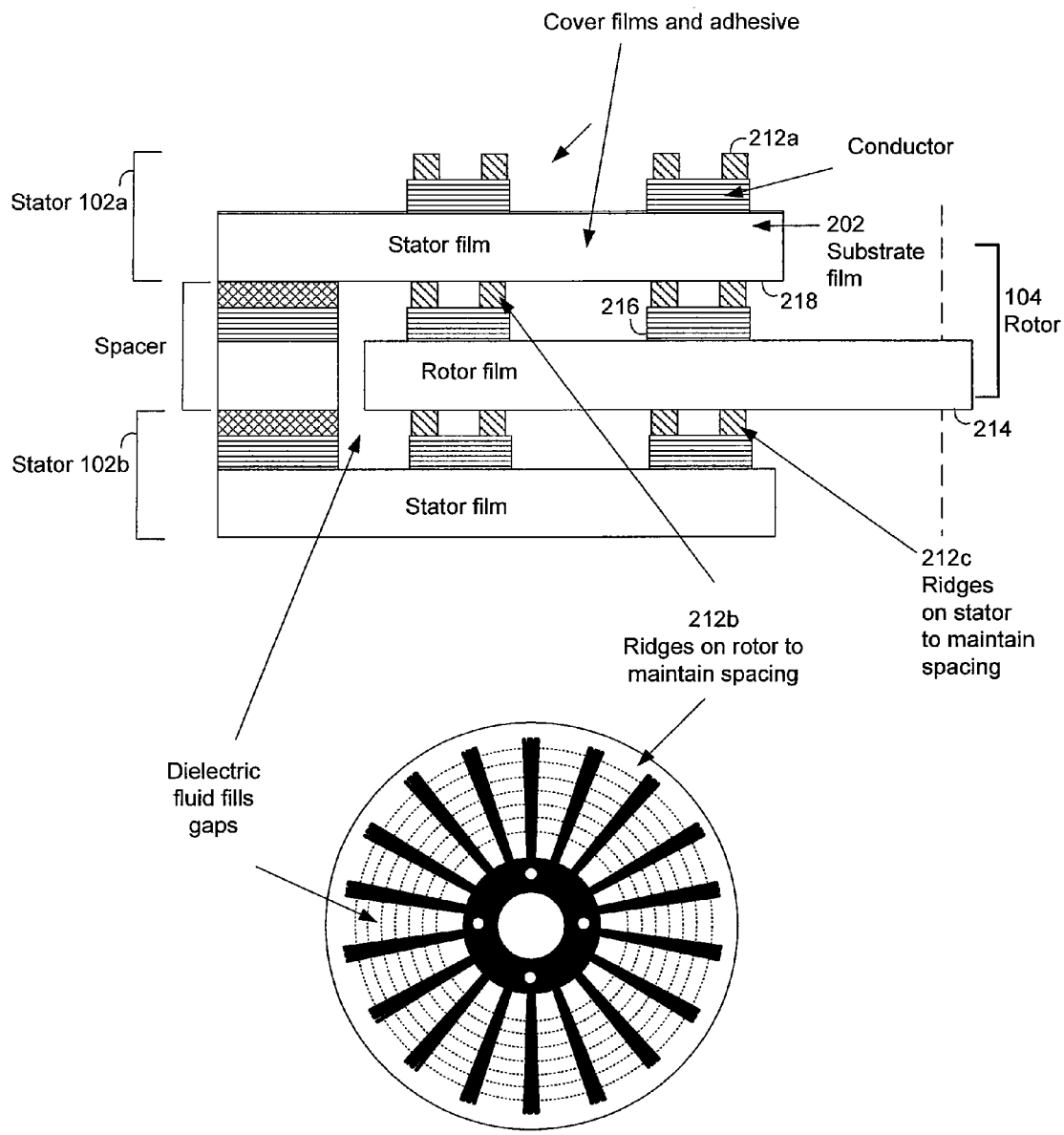
FIG. 16 shows a second embodiment of the electrodes with single-sided electrodes and patterned spacing rings on rotor and stator to maintain rotor-stator spacing.

FIG. 16 shows a different method of maintaining inter-layer spacing. Single sided electrodes are used for both rotor and stator, but an additional layer of circular ridges 212a-cis patterned on both the rotor and stator. These ridges serve to set the spacing between the layers, yet add little frictional drag because the area of a ridge is small compared to the total electrode area. For instance, if the active area has a radius of 2 inches and electrode phases are patterned in the order 0-1-2-2-1-0, each of the six electrode phases has electrodes that fall in a radius of about ⅓ inch. Allowing for inter-electrode gaps, the electrode radius may be approximately 0.300 inches. If each circular ridge uses a line width of 0.010 inches, three circular ridges 212a-c fall inside the radius of each electrode and still cover only 10% of the electrode. The remaining 90% is filled in with dielectric fluid. The circular ridges 212a-c maintain the proper spacing, but do not add significant frictional drag.

Note that the single sided electrode construction is not vertically symmetric (up-down) about the rotor electrode layer. Moving down to the stator below 102b, the electric field passes through the rotor substrate 214, then the stator spacer ridge 212b (and dielectric fluid) to the stator conductor 204. From the rotor electrode 216 to the upper stator electrode 204, the electric field first passes through the rotor spacing ridge 212b (and dielectric fluid), and then through the stator substrate 218 to the stator conductor 204. However, as long as the rotor 104 and stator 102 are fabricated with the same substrate and coverlay thicknesses, the fields from the rotor to the upper and lower stator electrodes will be nearly identical.

Figure 17:
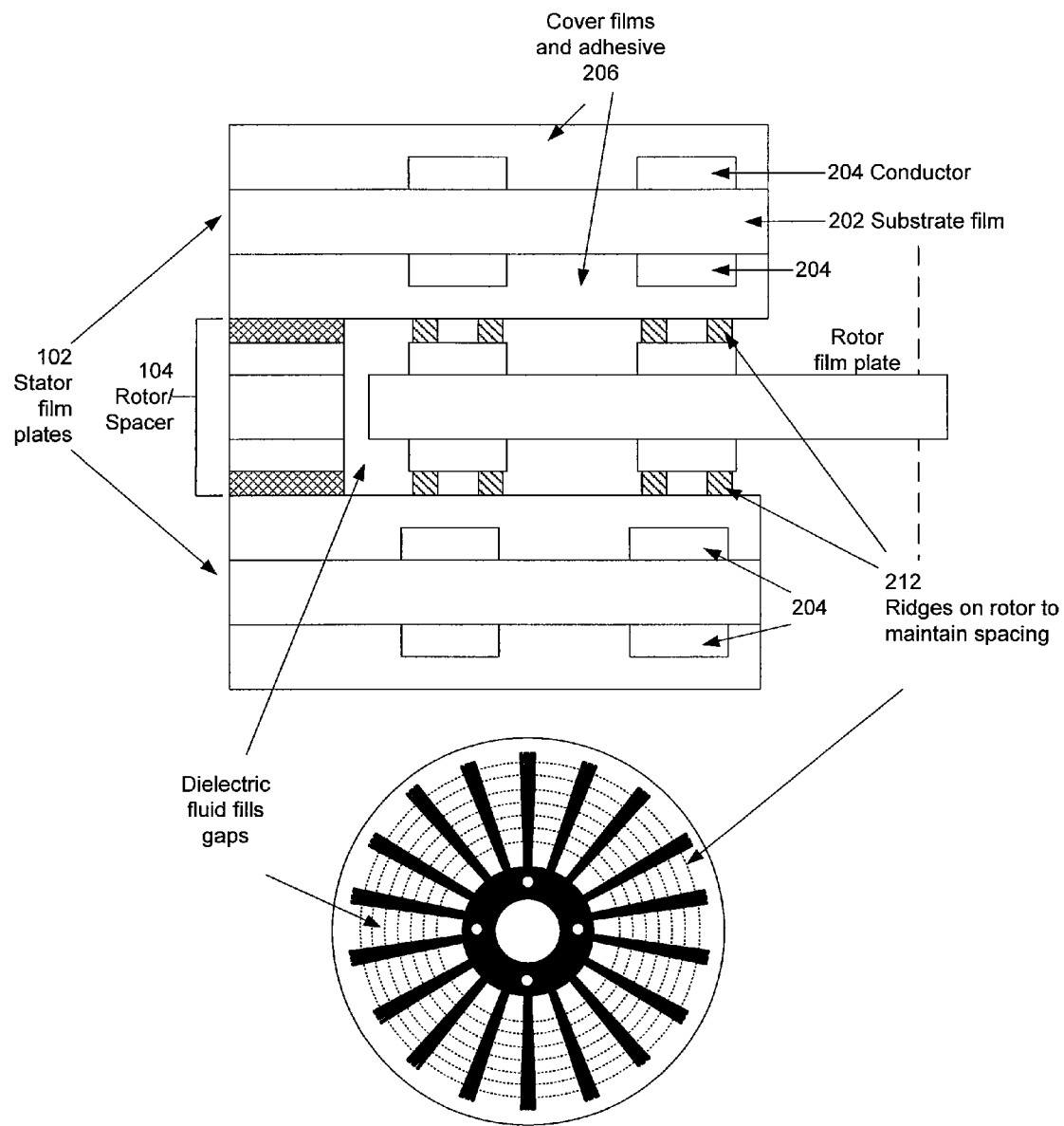
FIG. 17 shows a third embodiment of the electrodes using double-sided flexible circuits with a non-insulated rotor with patterned spacing rings on both sides.

FIG. 17 shows another embodiment using double-sided flexible circuit construction. The stators 102 are patterned with identical conductor layers 204 on both sides. Each phase has at least one feed through to conduct the same phase voltage to opposite sides of the circuit. The rotor 104 is also a double sided circuit, and in this case it is shown without a complete cover layer. With this design, the stator supplies the insulation 206 for both adjacent rotors and the rotor 104 supplies the spacing circular ridges for both adjacent stators. (Clearly the insulation could be divided between rotor and stator in different ways with little impact on performance.)

Double sided techniques allow more freedom in selecting the thickness of the substrate films because the electric field strength through the substrate film is not important. This construction can reduce the required drive voltage because the rotor-stator electrode spacing is determined only by the covercoat 206. However, the double sided technique requires close tolerances between opposite sides of each circuit, and can add to the total thickness of the actuator.

Inter-layer Connections

Figure 18:
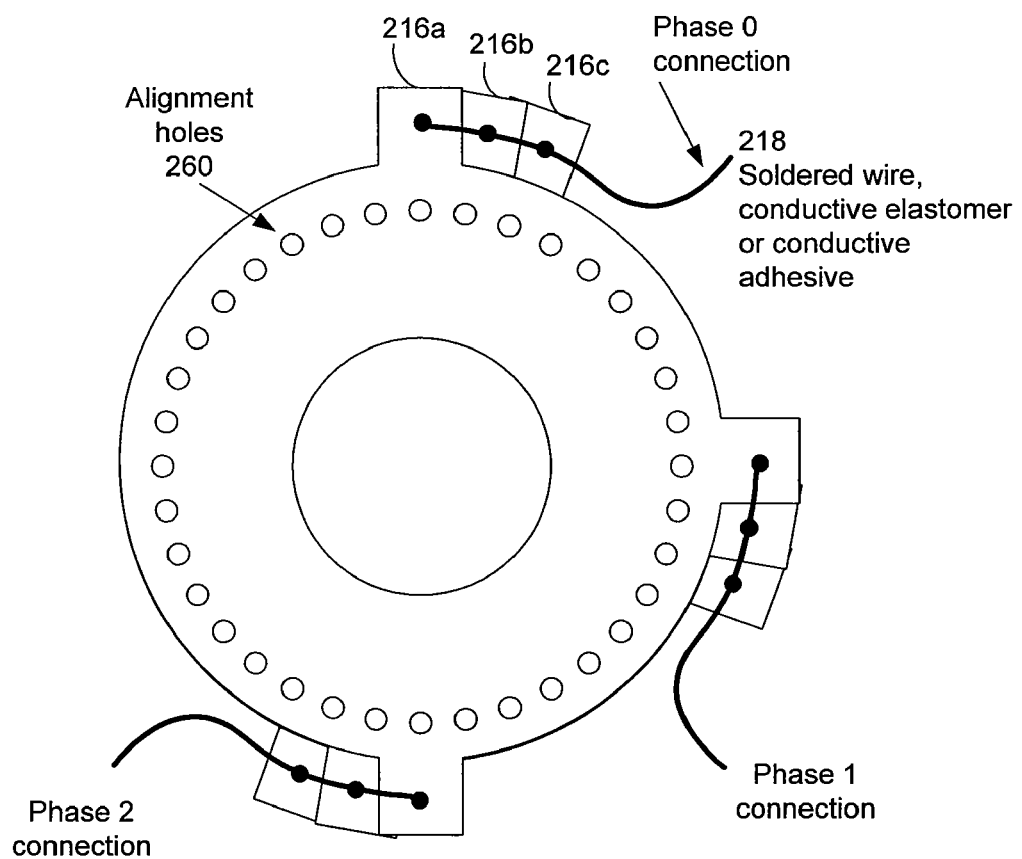
FIG. 18 is a diagram of a way to connect stator phases between multiple single-sided stator electrodes with successive layers rotated to expose electrode contacts.

The three phase voltages must be electrically connected to the conductors in each stator film plate. In an actuator with many layers, it is not practical to have individual wires connected to every layer. FIG. 18 shows a way to connect single-sided stator layers to the phase voltages. The stator film plates are substantially identical, but designed to be assembled in a way such that each stator film plate is angularly shifted relative to its neighbor by a set amount. Holes 260 are drilled in the stator plates to allow alignment pins to assure that all stator layers are rotated by an integral number of phase pitches relative to each other.

Once assembled, the tabs with conducting pads 216a-c form a spiral staircase, with the length of each step equal to one or more phase pitches. The conductor from the driving electronic circuitry then connects to each step through a soldered connection, or preferably through a conductive elastomer 218 such as the type typically used for EMI gaskets. The conductive elastomer is installed in a spiral to make contact with the top of each step of the staircase.

Figure 19:
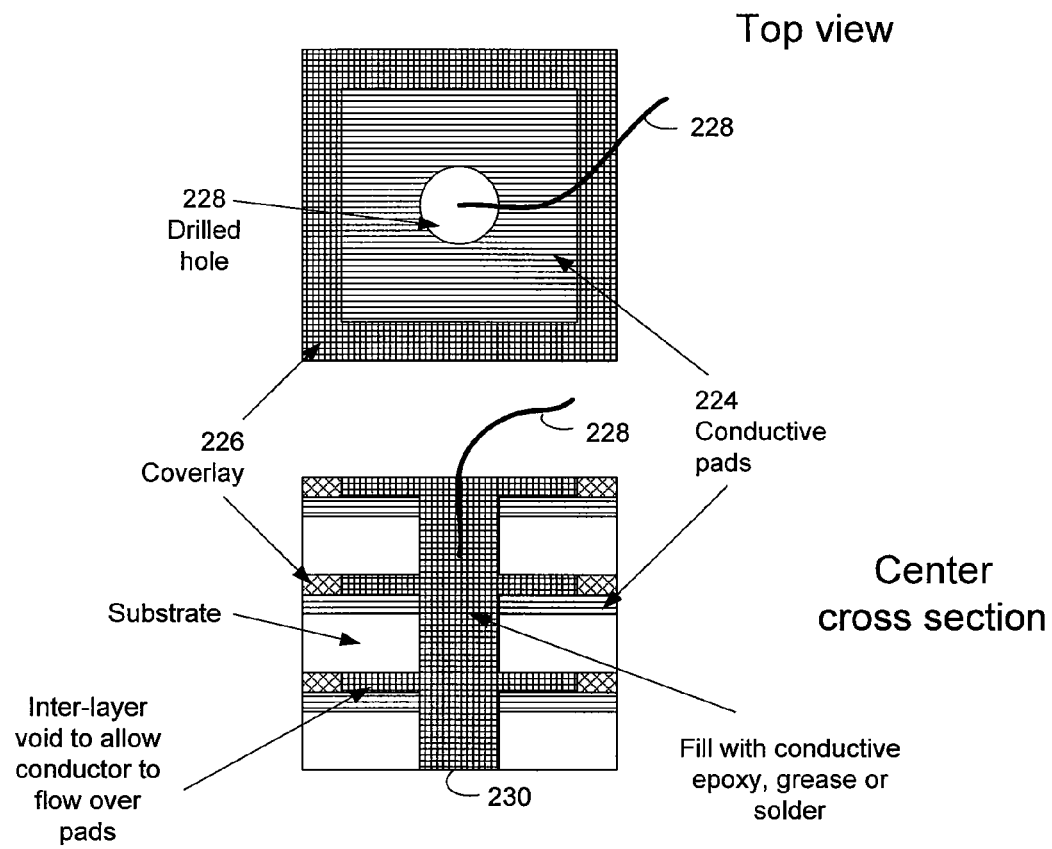
FIG. 19 shows a second type of inter-layer connection using drilled holes and coverlay-formed void areas filled with a conductor.

FIG. 19 shows a second method of interconnecting layers. The figure shows single-sided film plates, but the same technique works for double-sided films as well. A single contact is shown both in a top view and a cross section view. Each layer is designed with a conductive pad 224 and a coverlay 226 that is cut out to expose the center of the conductive pad. A hole 228 is drilled in the center of the pad.

When these film plates are stacked, a central shaft 230 is formed passing through the center of all layers in the stack. Each layer also has a void area extending over or under the exposed conductor pad area. When a conductive fluid is inserted into the shaft 230, some of the fluid enters the void area over and under each conductor, thereby making contact with it. The fluid is a conductive epoxy, silicone, grease, polymer, solder or any other suitable conductive material. The phase wire 228 can be inserted while the conductor is in the liquid state, and after it cures or cools, the conductor 228 serves to interconnect the layers as well as to secure the phase wire. Note that if the stator films are two-sided, the conducting fluid makes contact with the conductors on both sides.

Figure 20:
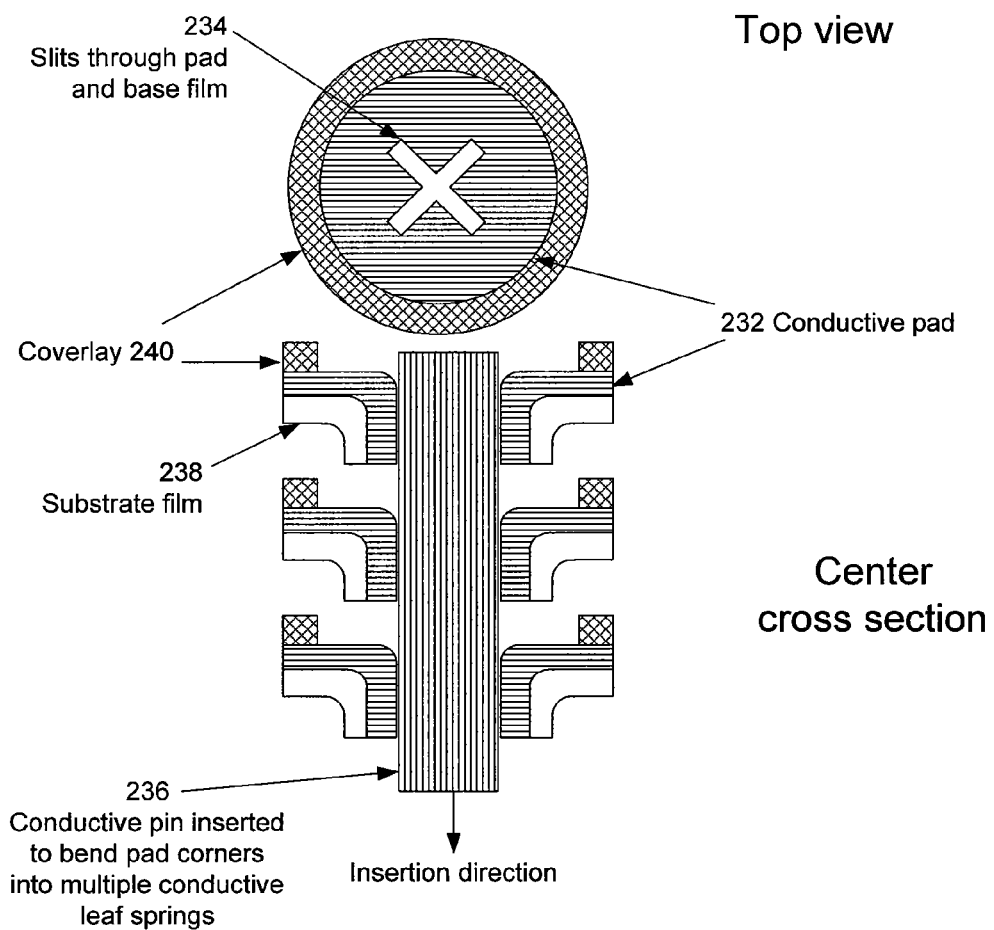
FIG. 20 shows a third type of inter-layer connection using slits cut in a conductive pad with a conductive pin inserted to make contact with one or more corners of the bent portion of the pad.

A third connection method for single-sided films is shown in FIG. 20. Each pad 232 has one or more slits 234 cut through the copper and base films 238, 240. The figure shows X-shaped slits producing four flaps, but fewer or more slits could be cut to produce fewer or more flaps. When a pin 236 is inserted from the conductor layer side, the flaps bend back to form leaf springs, and a portion of the conductive side of each spring is in contact with a side of the pin. The pin may have circular, square or rectangular cross section.

If both the pin and pad are covered with a thin layer of gold, the contact between the pin and pad forms a cold-weld that is known to be corrosion resistant. This arrangement has no permanent connection, and allows stator and rotor plates to be later separated and removed for inspection or repair. A second approach is to coat the pin with a thin layer of solder, then insert the pin, heat it, and allow it to cool. This technique provides a more permanent connection. The solder technique can also be used along with the self-alignment feature to fix the stator plates in permanent alignment.

Another possible connection method for two-sided designs is to use plated through holes to make the inter-layer connections. The spacers must also have plated through conductive areas to complete the connection. Sufficient force is applied to the stator/spacer sandwich to assure enough normal force to make continuous connections through the stack, or a conductive adhesive is applied between layers.

FIG. 21 shows a preferred embodiment of the complete rotor and stator design. This design shows electrodes in the 0-1-2-2-1-0 arrangement and does not have a coarse position sensor on each layer. (The electrodes are shown at an expanded scale for clarity; in the final design, the gaps between adjacent electrodes of the same phase are spaced more closely than the rings separating the different phases. This provides the tolerance to faults and defects.) Holes for alignment pins are shown on the inside of the rotor and outside of the stator. Pads with routed slits are used for inter-layer connections. The drawing also shows how the fabrication cost can be reduced by making use of material that otherwise would be wasted. The inside of the stators can be cut out to produce the rotor spacers, and the outside of the rotors can be cut out to produce the stator spacers.

The invention has been described with respect to specific implementations, but the concepts apply to broad classes of actuators. A rotary actuator has been described, but the electrodes could be arranged to form a linear actuator instead. The electrode design may have self-aligning electrodes as described, or could use non-segmented electrodes that forgo the self alignment property. The electrode design has all three phases on every stator layer, but other designs could have different types of stator layers, each with electrodes connected to a subset of the total phases. The description primarily describes three phase designs, but the concepts are easily extended to more phases. The design assumes a dielectric fluid between layers, but other types of dielectric could be used including air or a solid dielectric film sheet made from polypropylene or other polymer. The coarse position sensors could be integrated on each layer, incorporated on special layers, or added external to the actuator. The high voltage electronic circuitry is connected by wires to the actuator, but some of the electronic circuitry, particularly the high voltage section, could be incorporated inside the housing and immersed in the dielectric fluid.

Although the present invention has been described in accordance with the embodiments shown, variations to the embodiments would be apparent to those skilled in the art and those variations would be within the scope and spirit of the present invention. Accordingly, it is in tended that the specification and embodiments shown be considered exemplary only, with a true scope of the invention being indicated by the following claims and equivalents.

What is claimed is:

1. An electrostatic actuator, comprising:
    a stator plate having a stator electrode layer with an electrode layer layout in which the stator electrode layer is separated into p*n regions, for 'p' phases and 'n' instances of the p phases, where 'n' is any even number equal to or greater than 2, the regions being separated from each other by a region gap, wherein each instance includes p regions each of which being connected to a respective one of the p phases and electrically insulated from the other regions by the region gaps;
    a rotor plate stacked above or below the stator plate and having a rotor electrode layer with an electrode layer layout having p*n rotor regions, with all the rotor regions being electrically tied to a single source of voltage or ground; and
    an insulating medium between the stator and rotor plates, wherein the insulating medium is formed as circular rings each covering a portion of a respective region and each with a width smaller than the width of each circular ring's respective region.

2. The electrostatic actuator as in claim 1, wherein each of the regions in the stator and rotor plates is formed with a plurality of electrodes arranged with electrode gaps therebetween, and wherein the plurality of electrodes in each region being electrically tied to each other.

3. The electrostatic actuator as in claim 1, wherein the p phases are driven in succession, where the order of succession determines in which direction the rotor plate moves relative to the stator plate.

4. The electrostatic actuator as in claim 1, wherein the regions are formed as concentric rings separated by the region gaps which are also ring-shaped.

5. The electrostatic actuator as in claim 1, wherein the regions are lined up substantially parallel to each other.

6. The electrostatic actuator as in claim 1, further comprising a coarse position sensor integral to the stator and rotor plates or in a plate separate therefrom.

7. The electrostatic actuator as in claim 1, further comprising a fine position sensor integral to the stator and rotor plates or in a plate separate therefrom.

8. The electrostatic actuator as in claim 1, further comprising a plurality of plate groups each having an instance of the stator plate, rotor plate and insulating medium, the plate groups being stacked on top of each other and forming a multilayer actuator.

9. The electrostatic actuator as in claim 8, wherein the stator electrode layers are interconnected via pads with holes, pins inserted in the holes, and a conductive material that makes contact between the pins.

10. The electrostatic actuator as in claim 8, wherein the stator electrode layers are interconnected by inserting a pin through a slits cut in each stator electrode layer.

11. The electrostatic actuator as in claim 1, wherein the insulating medium is a film, a plurality of spheres, a dielectric fluid, or any combination thereof.

12. The electrostatic actuator as in claim 1, wherein the p phases are driven by an electronic control circuitry.

13. The electrostatic actuator as in claim 1, wherein each of the stator and rotor plates is double-sided, having an electrode layer on each of its opposite sides.

14. The electrostatic actuator as in claim 1, wherein each of the stator and rotor plates is made out of a flexible circuit material.

15. The electrostatic actuator as in claim 1, wherein the rotor plate is capable of rotation about an axis or movement along an axis, and when the electrostatic actuator is not powered, where none of the p phases is driven, the rotor is movable by external forces free from the stator plate.

16. The electrostatic actuator as in claim 1, further comprising a rotor sensing layer and a stator sensing layer, both for position sensing by capacitively coupling the rotor and stator sensing layers.

17. The electrostatic actuator as in claim 1, wherein the rotor plate self aligns to the stator plate when one of the p phases is driven.

18. The electrostatic actuator as in claim 1, further comprising alignment pins passing through holes in the rotor plate, wherein movement of the rotor plate is mechanically translated to movement of a shaft through the alignment pins.

19. The electrostatic actuator of claim 1, wherein p equals 3.

20. An electrostatic actuator, comprising:
- a stator plate having a stator electrode layer with an electrode layer layout in which the stator electrode layer is separated into p*n stator regions, for p phases and n instances of the p phases, where n is 1 or any even number equal to or greater than 2, the stator regions being separated from each other by a stator region gap, wherein each instance includes p regions each of which being connected to a respective one of the p phases and electrically insulated from the other regions by the stator region gaps;
- a rotor plate stacked above or below the stator plate and having a rotor electrode layer with a rotor electrode layer layout having p*n rotor regions, with all the rotor regions being electrically tied to a single source of voltage or ground;
- an insulating medium between the stator and rotor plates, wherein the insulating medium is formed as circular rings each covering a portion of a respective region and each with a width smaller than the width of each circular ring's respective region; and
- wherein the stator electrodes and the rotor electrodes are disposed such that the rotor electrodes are substantially aligned with only stator electrodes from a single phase of the stator plate at any point.

* * * * *